United States Patent
Asato et al.

(10) Patent No.: US 12,397,418 B2
(45) Date of Patent: Aug. 26, 2025

(54) PROCESSING METHOD, PROGRAM AND ROBOT SYSTEM

(71) Applicant: KAWASAKI JUKOGYO KABUSHIKI KAISHA, Kobe (JP)

(72) Inventors: Tatsutoshi Asato, Kobe (JP); Hideki Isoda, Kobe (JP); Masato Katsube, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 269 days.

(21) Appl. No.: 18/028,801

(22) PCT Filed: Oct. 1, 2021

(86) PCT No.: PCT/JP2021/036460
§ 371 (c)(1),
(2) Date: Mar. 28, 2023

(87) PCT Pub. No.: WO2022/071588
PCT Pub. Date: Apr. 7, 2022

(65) Prior Publication Data
US 2023/0330845 A1    Oct. 19, 2023

(30) Foreign Application Priority Data

Oct. 2, 2020   (JP) ................................. 2020-168041
Jan. 29, 2021  (JP) ................................. 2021-013514

(51) Int. Cl.
*B25J 9/16*   (2006.01)

(52) U.S. Cl.
CPC ............. *B25J 9/163* (2013.01); *B25J 9/1664* (2013.01)

(58) Field of Classification Search
CPC ......... B25J 9/163; B25J 9/1664; G05B 19/42; G05B 2219/34095; G05B 2219/34101; G05B 2219/40449; G05B 2219/45065
See application file for complete search history.

(56) References Cited

U.S. PATENT DOCUMENTS

2015/0227131 A1   8/2015  Murakami
2022/0063104 A1*  3/2022  Huang ................... B25J 9/163

FOREIGN PATENT DOCUMENTS

| JP | H09-216183 A | 8/1997 |
| JP | 2007-144538 A | 6/2007 |
| JP | 2015-153097 A | 8/2015 |
| JP | 2018-1381 A | 1/2018 |

* cited by examiner

*Primary Examiner* — Michael C Zarroli
(74) *Attorney, Agent, or Firm* — Oliff PLC

(57) ABSTRACT

A processing method includes one or both of a first processing and a second processing for extracting a reference teaching point from teaching points. The first processing extracts a reference teaching point having a difference between a direction vector from a teaching point preceding the reference teaching point to the reference teaching point, and a direction vector from the reference teaching point to a teaching point succeeding the reference teaching point, being equal to or more than a threshold. The second processing extracts the reference teaching point having one of a difference between a posture at a teaching point preceding the reference teaching point and a posture at the reference teaching point, and a difference between the posture at the reference teaching point and a posture of a teaching point succeeding the reference teaching point, being equal to or more than a threshold.

14 Claims, 17 Drawing Sheets

PROCESSING METHOD, PROGRAM AND ROBOT SYSTEM

CROSS-REFERENCE TO RELATED APPLICATIONS

This application claims the priorities and the benefits of Japanese Patent Application No. 2020-168041 filed on Oct. 2, 2020 and Japanese Patent Application No. 2021-013514 filed on Jan. 29, 2021 with the Japan Patent Office, the entire contents of which are incorporated herein as a part of this application by reference.

TECHNICAL FIELD

The present disclosure relates to a processing method, a program, and a robot system.

BACKGROUND ART

Conventionally, there is art for generating a control program for a robot, using data obtained as a result of manually operating the robot. For example, Patent Document 1 discloses a technique for generating motion control data of a painting robot based on manual spray operation data which is generated from detected operation of a manual spray gun for teaching. In order to reduce influences of waving of a moving path and rattling of the manual spray gun for teaching which is moved by an operator's hand, the technique of Patent Document 1 generates the motion control data so that the spray gun of the robot moves along a straight line or a specific curve in a spray section from a spray start position to a spray stop position.

REFERENCE DOCUMENT(S) OF CONVENTIONAL ART

Patent Document

[Patent Document 1] JP2018-001381A

DESCRIPTION OF THE DISCLOSURE

The technique of Patent Document 1 defines the moving path of the spray gun which is an end effector of the robot as a straight line, or a specific curve, such as an arc. For example, when a workpiece having a complicated shape is a target object to be painted, the shape of the moving path of the manual spray gun for teaching also becomes complicated. Since the moving path of the spray gun is formed using the straight line or the specific curve which connects between the spray start position and the spray stop position, it is difficult to reflect the moving path of the manual spray gun for teaching with sufficient accuracy.

One purpose of the present disclosure is to provide a processing method, a program, and a robot system, which enable generation of data which reflects movement of an end effector with sufficient accuracy, and is simple in configuration.

A processing method according to one aspect of the present disclosure is a method of processing teaching data, the teaching data including position/posture information on an end effector attached to a robot, and including teaching points that form a moving route of the end effector in a time-series manner. The method includes one or both of a first processing and a second processing. In the first processing, a reference teaching point is extracted from the teaching points, and the extracted reference teaching point has a difference between a direction vector from a position of a teaching point preceding the reference teaching point by a given interval to a position of the reference teaching point, and a direction vector from the position of the reference teaching point to a position of a teaching point succeeding the reference teaching point by a given interval, being equal to or more than a threshold. In the second processing, the reference teaching point is extracted from the teaching points, and the extracted reference teaching point has one of a difference between a posture at a teaching point preceding the reference teaching point by a given interval and a posture at the reference teaching point, and a difference between the posture at the reference teaching point and a posture of a teaching point succeeding the reference teaching point by a given interval, being equal to or more than a threshold.

MODES FOR CARRYING OUT THE DISCLOSURE

Embodiment

Figure 1:
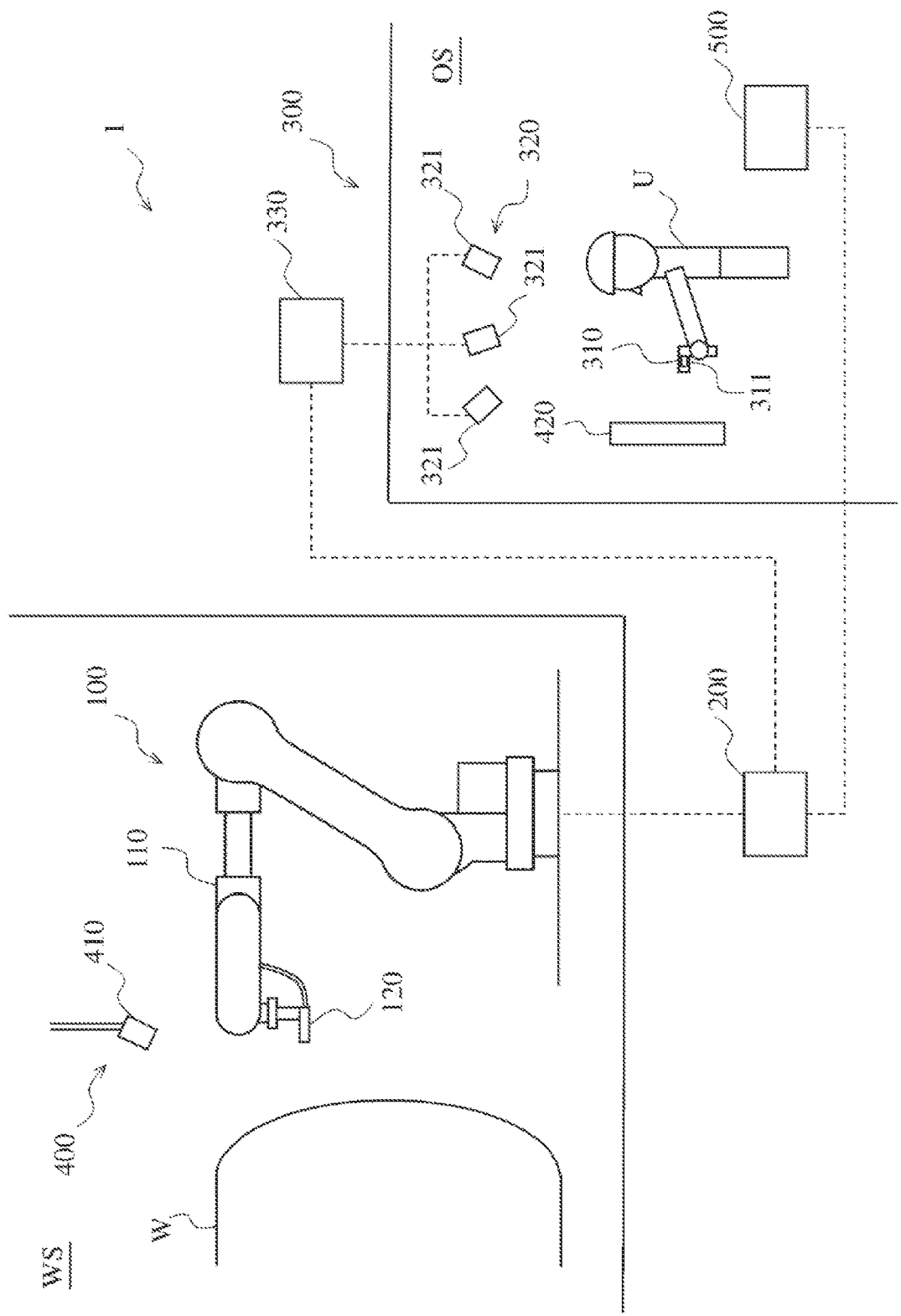
FIG. 1 is a schematic view illustrating one example of a configuration of a robot system according to an exemplary embodiment.

Hereinafter, an exemplary embodiment of the present disclosure is described with reference to the drawings. Each embodiment which will be described below is to illustrate a comprehensive or concrete example.

Among components in the following embodiment, components which are not described in the independent claims indicative of the top concept are described as arbitrary components. Each figure in the accompanying drawings is a schematic figure, and it is not necessarily illustrated exactly. Further, in each figure, the same reference characters are assigned to substantially the same components, and therefore, redundant explanation may be omitted or simplified. The term "device" in this specification and the claims may mean not only a sole device, but also a system including devices.

[Configuration of Robot System]

A configuration of a robot system 1 according to an exemplary embodiment is described. FIG. 1 is a schematic view illustrating one example of the configuration of the robot system 1 according to the exemplary embodiment. As illustrated in FIG. 1, the robot system 1 includes a robot 100, a robot controller 200, an operation system 300, an imaging system 400, and an information processor 500. In this embodiment, the following description is given under a condition where the robot system 1 is a system which makes the robot 100 perform a painting work of a workpiece W which is a target object. A target work of the robot system 1 is not limited to the painting work, but may be any kind of works which can be performed by the robot 100. The configuration of the robot system 1 may be changed arbitrarily according to the target work.

The robot system 1 is disposed in a work space WS and an operation space OS which are separated and shielded from each other. In the work space WS, the workpiece W, the robot 100, and a camera 410 of the imaging system 400 are disposed. In the operation space OS, the operation system 300, a display unit 420 of the imaging system 400, and the information processor 500 are disposed. The robot controller 200 may be disposed at any kind of place including the work space WS, the operation space OS, and other places. Although an operation processor 330 of the operation system 300 is disposed outside the work space WS and the operation space OS, it may be disposed in the operation space OS.

The robot 100 includes a robotic arm 110 and an end effector 120. The robotic arm 110 has at least one joint, and has at least one degree of freedom. The end effector 120 is configured so that it can apply an action to the workpiece W, and it is a paint gun in this embodiment. A tip end of the robotic arm 110 is configured so that the end effector 120 is attached thereto. The robotic arm 110 can freely change the position and the posture of the end effector 120. Although in this embodiment the form of the robotic arm 110 is a vertical articulated type, it is not limited to this configuration, and it may be any kind of form, such as a horizontal articulated type, a polar coordinate type, a cylindrical coordinate type, and a Cartesian coordinate type.

Figure 2:
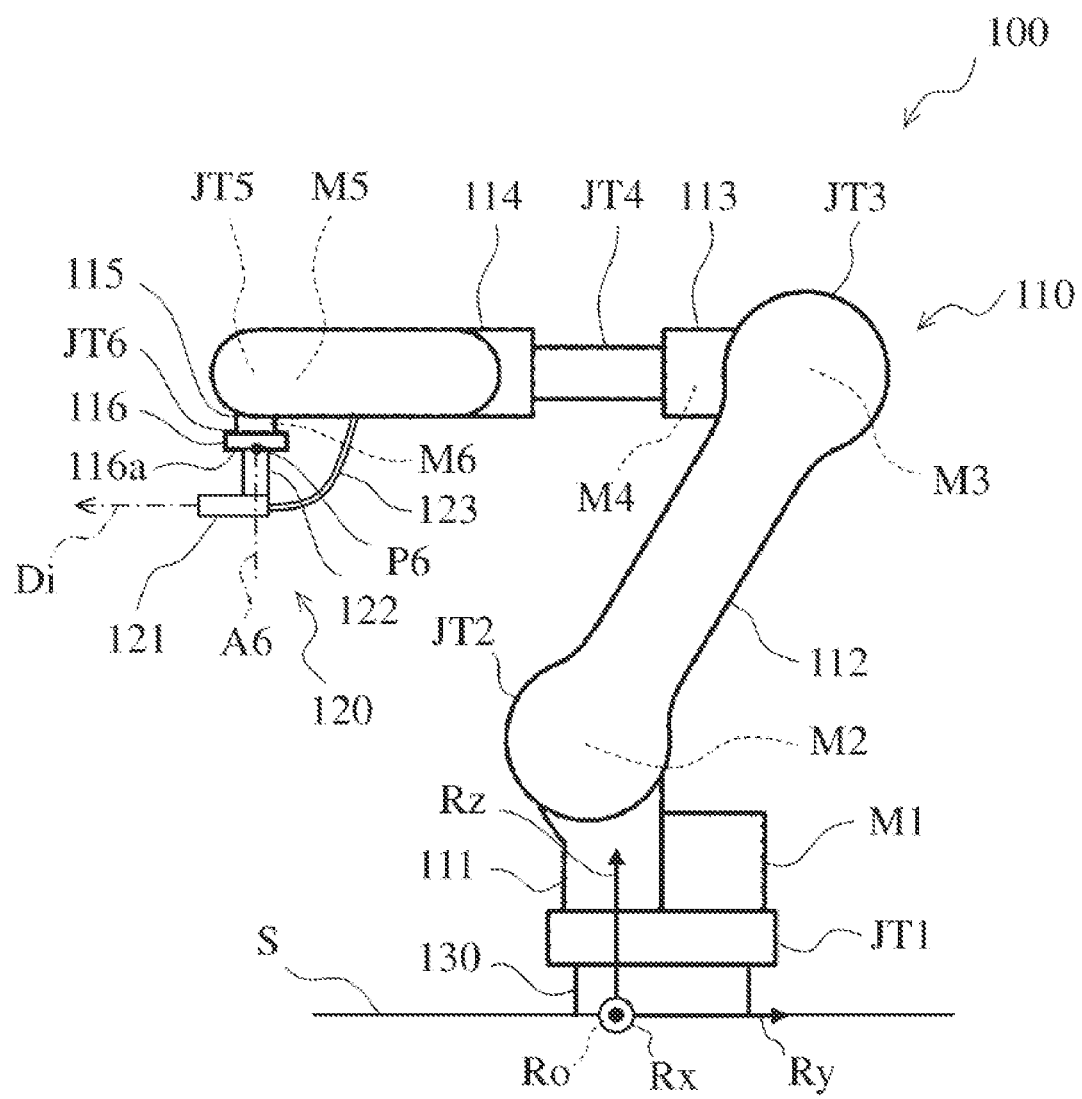
FIG. 2 is a side view illustrating one example of a configuration of a robot according to this embodiment.

FIG. 2 is a side view illustrating one example of a configuration of the robot 100 according to this embodiment. As illustrated in FIG. 2, the robot 100 further includes a pedestal 130 which supports the robotic arm 110. The robotic arm 110 includes six links 111-116 disposed serially from a base end supported by the pedestal 130 toward a tip end, six joints JT1-JT6 which sequentially connect the links 111-116 so as to be rotatable, and six arm drives M1-M6 which rotate the respective joints JT1-JT6. The joints JT1-JT6 are rotary joints.

The joint JT1 couples a base-end part of the link 111 to the pedestal 130 so as to be rotatable on a rotation axis perpendicular to a support surface S of the pedestal 130. The above-described rotation axis is a vertical axis. The joint JT2 couples a base-end part of the link 112 to a tip-end part of the link 111 so as to be rotatable on a horizontal rotation axis along the support surface S. The joint JT3 couples a base-end part of the link 113 to a tip-end part of the link 112 so as to be rotatable on a horizontal rotation axis. The joint JT4 couples a base-end part of the link 114 to a tip-end part of the link 113 so as to be rotatable on a rotation axis extending in the longitudinal direction of the link 113. The joint JT5 couples a base-end part of the link 115 to a tip-end part of the link 114 so as to be rotatable on a rotation axis perpendicular to the rotation axis of the link 114. The joint JT6 couples a base-end part of the link 116 to a tip-end part of the link 115 so as to be twistable on a twist rotation axis A6.

A flange face 116a which is an end face of the link 116 constitutes a mechanical interface for connecting with the end effector 120. The arm drives M1-M6 include servo motors as electric motors which are drive sources, respectively. The servo motor includes a rotation sensor, such as an encoder. The servo motors of the arm drives M1-M6 each send, to the robot controller 200, information including a rotation amount of the servo motor detected by the rotation sensor, and a value of current applied to the servo motor, as feedback information. The robot controller 200 performs, to each servo motor, a feedback control using the feedback information (i.e., a servo control).

Figure 3:
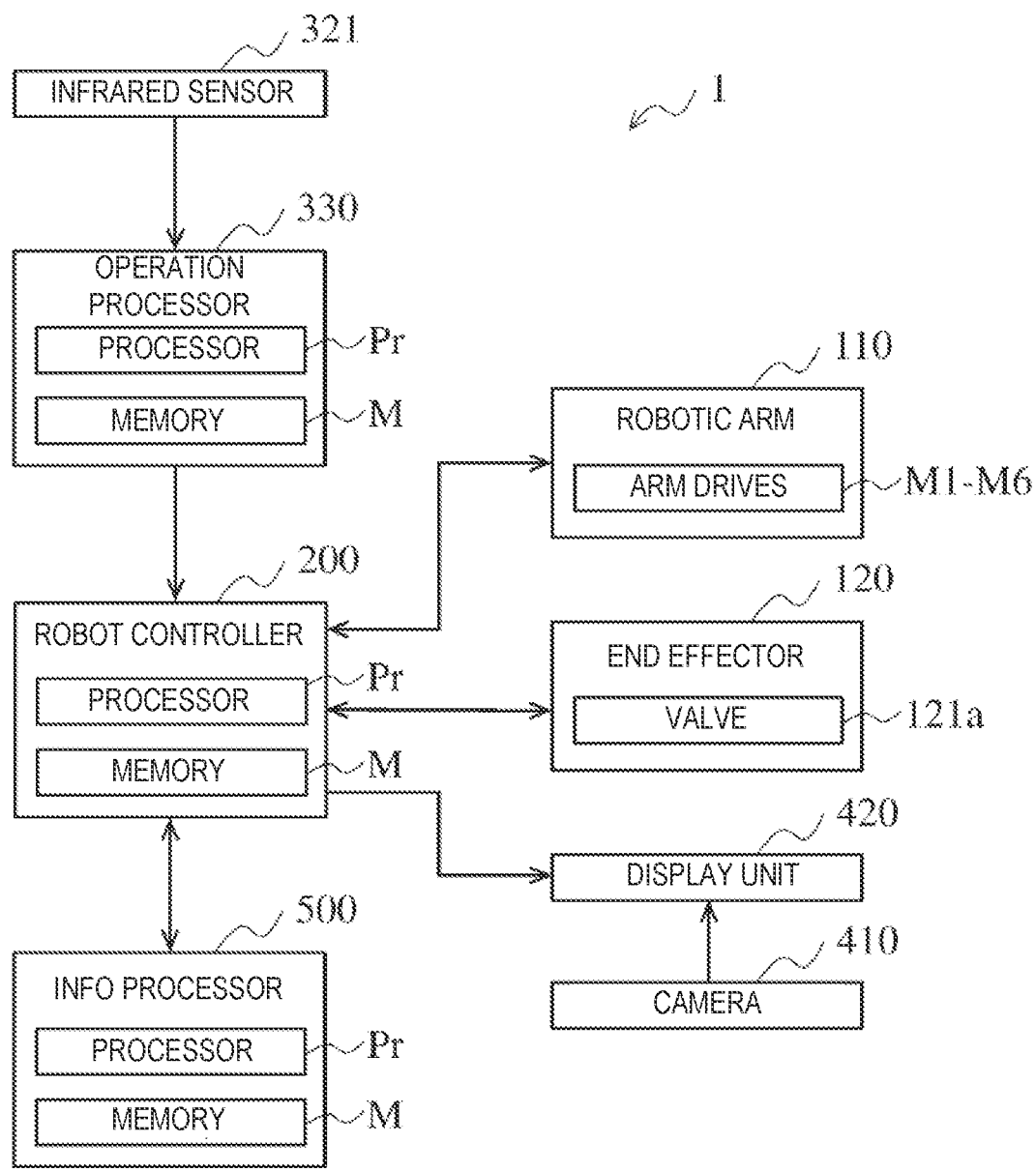
FIG. 3 is a block diagram illustrating one example of a hardware configuration of the robot system according to this embodiment.

The end effector 120 includes a sprayer 121 and a support 122 which supports the sprayer 121. The support 122 is configured to be connected to the flange face 116a of the link 116. The sprayer 121 is supported by the link 116 via the support 122. Although in this embodiment a spraying direction Di of paint from the sprayer 121 is perpendicular to the twist rotation axis A6 of the link 116, it is not limited to this configuration, but an angle between the spraying direction Di and the twist rotation axis A6 may be any angle. The sprayer 121 is connected with a spray pump which pumps paint via a spray hose 123 disposed along the robotic arm 110. The sprayer 121 includes a valve 121a which controls ON/OFF of the spraying of paint fed via the spray hose 123. The valve 121a is illustrated in FIG. 3. The robotic arm 110 can freely change the position and the spraying direction Di of the sprayer 121.

As illustrated in FIGS. 1 and 2, the robot controller 200 controls operation of the entire robot 100. For example, the robot controller 200 controls operation of the servo motors of the arm drives M1-M6. The robot controller 200 controls operation of the valve 121a of the sprayer 121. The robot controller 200 may include a computer apparatus which generates a command to the arm drives M1-M6 and the sprayer 121, and may further include electric circuitry for controlling electric power supplied to the arm drives M1-M6 and the sprayer 121. The above-described computer apparatus may include processing circuitry or circuitry. The circuitry may include the processing circuitry. The robot controller 200 is connected with the robot 100 wiredly, wirelessly, or a combination thereof. Communications therebetween may be any kind of wired and wireless communications.

As illustrated in FIG. 1, the imaging system 400 includes the camera 410 and the display unit 420. The camera 410 and the display unit 420 are disposed at locations away from each other, and they are connected wiredly, wirelessly, or a combination thereof. The camera 410 images the workpiece W and sends data of the captured image to the display unit 420. The display unit 420 includes a display etc., and is disposed so as to display an image to a user U inside the operation space OS. For example, the display unit 420 displays the image of the workpiece W sent from the camera 410. The user U can manipulate the robot 100, while visually observing the image of the workpiece W displayed on the display unit 420. The display unit 420 is also connected with the robot controller 200 wiredly, wirelessly, or a combination thereof, and is configured to display information provided from the robot controller 200.

The operation system 300 is configured to send, to the robot controller 200, information on operation inputted by the user U. The operation system 300 includes an operation terminal 310, an operation detector 320, and an operation processor 330. The operation terminal 310 is configured so that the user U can grip, and, for example, it has a shape and a size similar to a paint gun for manually spraying by a person. The user U can freely change the position and the posture of the gripped operation terminal 310 in a three-dimensional space. The operation terminal 310 carries infrared markers 311. The operation detector 320 includes infrared sensors 321. In detail, three infrared sensors 321 are disposed around the user U at positions away from the operation terminal 310, and disposed toward the user U. The three infrared sensors 321 are connected with the operation processor 330 wiredly, wirelessly, or a combination thereof.

Each infrared marker 311 emits infrared light. Each infrared marker 311 may be a luminous body which emits infrared light therefrom, such as an infrared LED (Light Emitting Diode), or may be a reflector which reflects the irradiated infrared light, or may be configured so as to include both the luminous body and the reflector.

The infrared sensor 321 receives infrared light from each infrared marker 311, and identifies the infrared marker 311 which is a source of the infrared light based on identification information on the infrared light of each infrared marker 311. The infrared sensor 321 detects a direction, an intensity, an intensity distribution, etc. of the infrared light received from each infrared marker 311, and sends the detection results to the operation processor 330. The infrared sensor 321 may be configured to only receive infrared light, or may be configured to emit infrared light therefrom and receive infrared light, such as a reflected light of the infrared light. In the latter case, the infrared sensor 321 may be an infrared camera.

The operation processor 330 detects the position and the posture of each infrared marker 311 by using the detection result of the infrared light of the infrared marker 311 received from the corresponding infrared sensor 321. The operation processor 330 performs calculations on the detection results of the infrared light of the infrared markers 311 using the three infrared sensors 321, and detects a three-dimensional position and a three-dimensional posture of the operation terminal 310. The operation processor 330 sends the detected three-dimensional position and posture of the operation terminal 310 to the robot controller 200 as operation commands indicative of the operation inputted by the user U. The operation processor 330 includes a computer apparatus for performing the above-described operation. The computer apparatus may include processing circuitry or circuitry. The circuitry may include the processing circuitry.

On the contrary to the above configuration, the infrared sensor 321 may be attached to the operation terminal 310, and the infrared marker 311 may be disposed away from the operation terminal 310. The positions and the numbers of infrared markers 311 and infrared sensors 321 are not limited in particular, as long as they can detect the position, the posture, etc. of the operation terminal 310.

The information processor 500 is configured to generate control data for making the robot 100 perform a given operation (i.e., the painting work). The information processor 500 processes operation associated data relevant to the operation of the robot 100 which moves the end effector 120, and generates the control data for making the robot 100 perform the given operation. Although in this embodiment the information processor 500 generates the control data by using, as the operation associated data, log data which the robot controller 200 records when it makes the robot 100 perform the given operation, it is not limited to this configuration, but the control data may be generated by using any kind of operation associated data. For example, the operation associated data may not be data acquired from the result of operation which the robot 100 actually performed, but may be data generated by a computer program. For example, the operation associated data may be teaching data including information on teaching points. The teaching points may include position/posture information on the end effector 120 attached to the robotic arm 110, and may be configured to form a moving route of the end effector 120 in a time-series manner.

Such an information processor 500 includes a computer apparatus. The computer apparatus may include processing circuitry or circuitry. The circuitry may include the processing circuitry. The information processor 500 may be configured to accept information, a command, data, etc. from the user U, an external apparatus, etc. The information processor 500 may be configured to output the information, the command, the data, etc. to the external apparatus etc. The information processor 500 may include a display, a speaker, or both so that it outputs image, sound, or both. For example, the information processor 500 may be circuitry, a circuitry board, a computer module, a personal computer, a workstation, a smart device, such as a smartphone and a tablet, or other terminal units.

[Hardware Configuration of Robot System]

FIG. 3 is a block diagram illustrating one example of a hardware configuration of the robot system 1 according to this embodiment. As illustrated in FIG. 3, the robot controller 200 controls the robot 100 in a manual operation mode, an automatic operation mode, and a teaching mode.

The manual operation mode is an operation mode for making the robot 100 operate according to the operation by the user U. The robot controller 200 controls operation of the robotic arm 110 according to an operation command received from the operation processor 330 of the operation system 300 to move the end effector 120. The robot controller 200 calculates the three-dimensional position and the three-dimensional posture of the end effector 120 corresponding to the three-dimensional position and the three-dimensional posture of the operation terminal 310 which are included in the operation command, as a target position and a target posture. The robot controller 200 sends, to the arm drives M1-M6, a driving command for operating the robotic arm 110 so that the end effector 120 is moved to the target position and the target posture.

Although not limited to this configuration, in this embodiment, in all the operation modes, a reference of the position of the end effector 120 controlled by the robot controller 200 is a position of a point P6 illustrated in FIG. 2, and a reference of the posture of the end effector 120 controlled by the robot controller 200 is the spraying direction Di illustrated in FIG. 2. The point P6 is an intersection between the flange face 116a of the link 116 and the twist rotation axis A6. For example, the position of the point P6 and the spraying direction Di are expressed using a robot coordinate system on the basis of the robot 100. For example, as illustrated in FIG. 2, the robot coordinate system may be defined by an origin Ro at the position of the pedestal 130 on the support surface S, Rx-axis and Ry-axis which are parallel with the support surface S and are perpendicular to each other at the origin Ro, and Rz-axis which is perpendicular to the support surface S and is perpendicular to the Rx-axis and the Ry-axis at the origin Ro. The robot controller 200 controls the position of the point P6 of the end effector 120 and the spraying direction Di.

The automatic operation mode is an operation mode for making the robot 100 operate automatically according to the control program (i.e., operate autonomously). The robot controller 200 controls the operation of the robotic arm 110 according to the teaching data included in the control program to move the end effector 120. The teaching data includes, in a time-series manner, the information on the teaching points including the target position and the target posture of the end effector 120 according to the order of the end effector 120 passing through the teaching points. For example, the information on the teaching point associatedly includes the target position of the end effector 120, the target posture of the end effector 120 at the target position, and a target time of arrival of the end effector 120 to the teaching point. The teaching data may be generated in the teaching mode. The robot controller 200 sends, to the arm drives M1-M6, a driving command for operating the robotic arm 110 so that the end effector 120 is moved to the target position and the target posture of each teaching point of the teaching data.

The teaching mode is a mode for generating the teaching data. In the teaching mode, the robot controller 200 performs a control similar to the manual operation mode. The robot controller 200 operates the robotic arm 110 so that the end effector 120 is moved according to the operation command received from the operation processor 330, and records the drive results of the arm drives M1-M6 under operation, as log data.

The log data may include the information on the position and the posture of the end effector 120 in the drive results of the arm drives M1-M6 (i.e., the information on the position and the posture of the end effector 120 corresponding to the drive results of the arm drives M1-M6). The robot controller 200 records the log data of the drive results of the arm drives M1-M6 for every given first time which is one example of a sampling interval. For example, the given first time may be less than 1 second, and in this embodiment, it is less than 10 milliseconds. The sampling interval may not be a time interval but a distance interval. In this case, the robot controller 200 may record the log data of the drive results of the arm drives M1-M6, for example, at a timing of every given distance of the position of the end effector 120, every given amount of change in the posture, or a combination thereof.

The robot controller 200 may store the log data as first teaching data, and may use it in the automatic operation mode. The first teaching data includes information on the teaching points for every given first time. Alternatively, the robot controller 200 may send the log data to the information processor 500, may store the control data which is the log data which is processed by the information processor 500 as second teaching data, and may use it in the automatic operation mode. The second teaching data includes information on the teaching points of which the number is less than the teaching points of the first teaching data. The robot controller 200 may determine which one of the first teaching data and the second teaching data is to be adopted according to the command inputted by the user U. The command may be inputted into the information processor 500, and may be sent to the robot controller 200 from the information processor 500.

In the teaching mode, the robot controller 200 may perform a control in which the manual operation mode and the automatic operation mode are combined. For example, the robot controller 200 may be able to accept the operation command for the user U from the operation processor 330, while operating the robotic arm 110 by a control similar to the automatic operation mode. When the operation command is received, the robot controller 200 may make the robotic arm 110 perform operation in which the operation of the robotic arm 110 according to the operation command is added to the operation of the robotic arm 110 according to the teaching data. Alternatively, the robot controller 200 may make the robotic arm 110 perform operation of the robotic arm 110 according to the operation command, instead of the operation of the robotic arm 110 according to the teaching data. Therefore, the robot controller 200 records the drive results of the arm drives M1-M6 according to data in which the teaching data is corrected by the user's U manual operation, as the log data.

The computer apparatus of the robot controller 200, the operation processor 330, and the information processor 500 includes a processor Pr and a memory M. The computer apparatus may further include a storage which stores various data. The storage may be comprised of a storage device, such as a semiconductor memory, a hard disk drive, and an SSD (Solid State Drive). The processor Pr and the memory M constitute processing circuitry or circuitry of the computer apparatus. The processing circuitry or the circuitry transmits and receives a command, information, data, etc. to/from other apparatuses. The processing circuitry or the circuitry accepts an input of a signal from each of various apparatus, and outputs a control signal to each target to be controlled.

The memory M stores a program which the processor Pr executes, various data, etc. The memory M may be comprised of a storage device, such as a semiconductor memory including a volatile memory and a nonvolatile memory. Although not limited to this configuration, the memory M includes a RAM (Random Access Memory) which is a volatile memory, and a ROM (Read-Only Memory) which is a nonvolatile memory in this embodiment.

The processor Pr forms a computer system together with the RAM and the ROM. The computer system may realize the function of the computer apparatus by the processor Pr executing a program stored in the ROM using the RAM as a work area. A part or all of the function of the computer apparatus may be realized by the above-described computer system, or may be realized by hardware circuitry for exclusive use, such as electronic circuitry or integrated circuitry, or may be realized by a combination of the computer system and the hardware circuitry which are described above. The computer apparatus may be configured to perform each processing by a centralized control of a sole computer apparatus, or may be configured to perform each processing by a distributed control of a collaboration of computer apparatuses.

Although not limited to this configuration, for example, the processor Pr may include a CPU (Central Processing Unit), an MPU (Micro Processing Unit), a GPU (Graphics Processing Unit), a microprocessor, a processor core, a multiprocessor, an ASIC (Application-Specific Integrated Circuit), an FPGA (Field Programmable Gate Array), etc., and it may realize each processing by logical circuitry or dedicated circuitry formed in an IC (Integrated Circuit) chip, an LSI (Large Scale Integration), etc. Processings may be realized by one or more integrated circuits, or may be realized by sole integrated circuitry.

The robot controller 200, the operation processor 330, and the information processor 500 may be configured to include at least a part of the functions of others among the robot controller 200, the operation processor 330, and the information processor 500. For example, two or more among the robot controller 200, the operation processor 330, and the information processor 500 may be included in one device.

[Functional Configuration of Information Processor]

Figure 4:
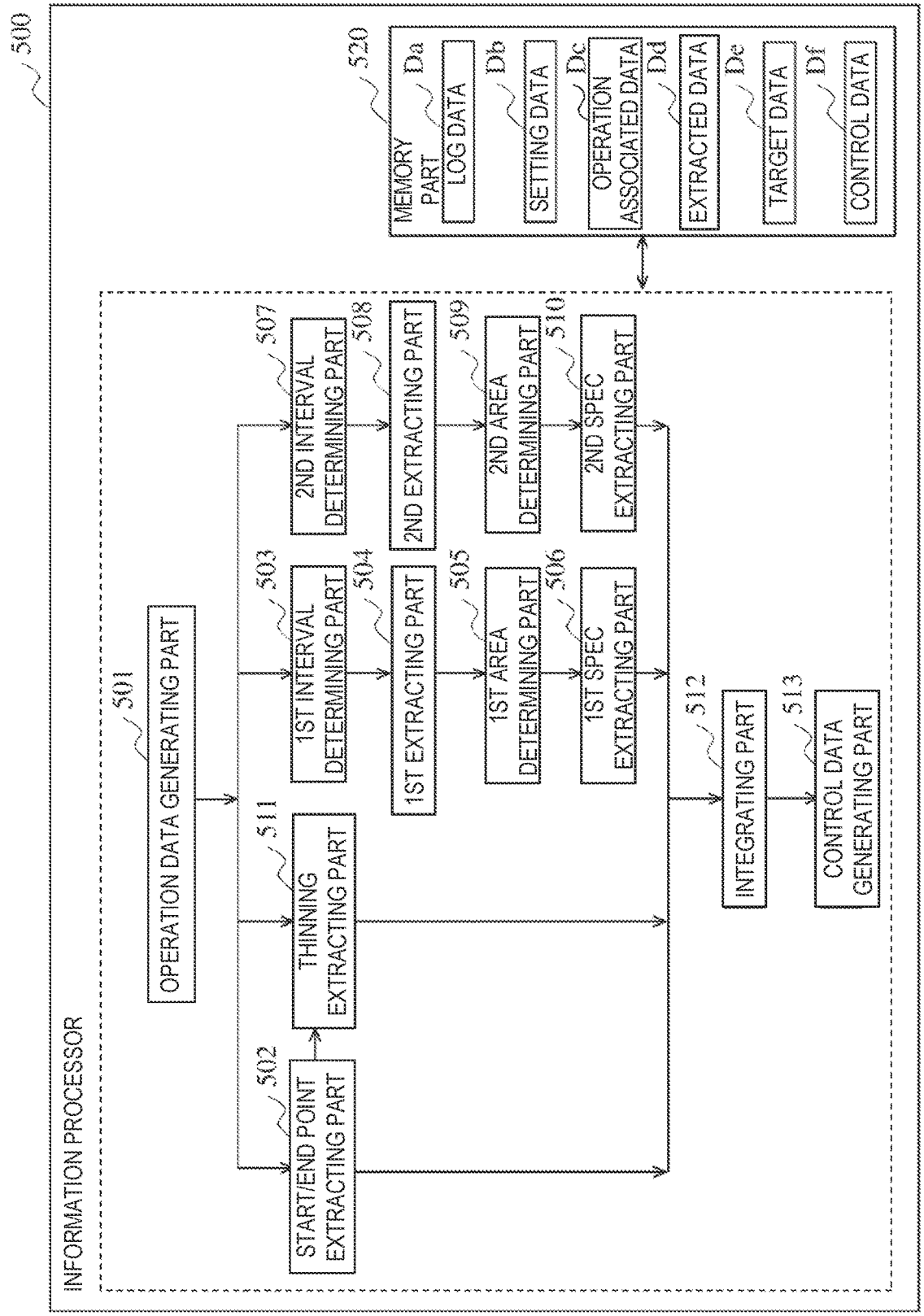
FIG. 4 is a block diagram illustrating one example of a functional configuration of an information processor according to this embodiment.

A functional configuration of the information processor 500 is described. FIG. 4 is a block diagram illustrating one example of the functional configuration of the information processor 500 according to this embodiment. As illustrated in FIG. 4, the information processor 500 includes an operation data generating part 501, a start/end point extracting part 502, a first interval determining part 503, a first extracting part 504, a first area determining part 505, a first specification extracting part 506, a second interval determining part 507, a second extracting part 508, a second area determining part 509, a second specification extracting part 510, a thinning extracting part 511, an integrating part 512, a control data generating part 513, and a memory part 520, as functional components. All the above-described functional components are not essential, and, for example, they may be changed according to the function of the information processor 500.

The functions of the functional components other than the memory part 520 are realized by the processor Pr, the memory M, etc. of the computer apparatus of the information processor 500.

The function of the memory part 520 is realized by the memory M, the storage, or a combination thereof of the computer apparatus of the information processor 500. The memory part 520 stores log data Da, setting data db, operation associated data Dc, extracted data Dd, target data De, control data Df, and various other data.

The operation data generating part 501 generates the operation associated data Dc by using the log data Da of the memory part 520. The operation data generating part 501 uses the drive results of the arm drives M1-M6 for every given first time included in the log data Da to calculate the three-dimensional position and the three-dimensional posture of the end effector 120 for every given first time corresponding to the drive results of the arm drives M1-M6, and stores the calculated result in the memory part 520 as the operation associated data Dc. When the information on the three-dimensional position and posture of the end effector 120 for every given first time are included in the log data Da, the operation data generating part 501 extracts these information from the log data Da, and stores them in the memory part 520 as the operation associated data Dc. For example, the three-dimensional position and the three-dimensional posture of the end effector 120 may be expressed using the robot coordinate system.

Figure 5:
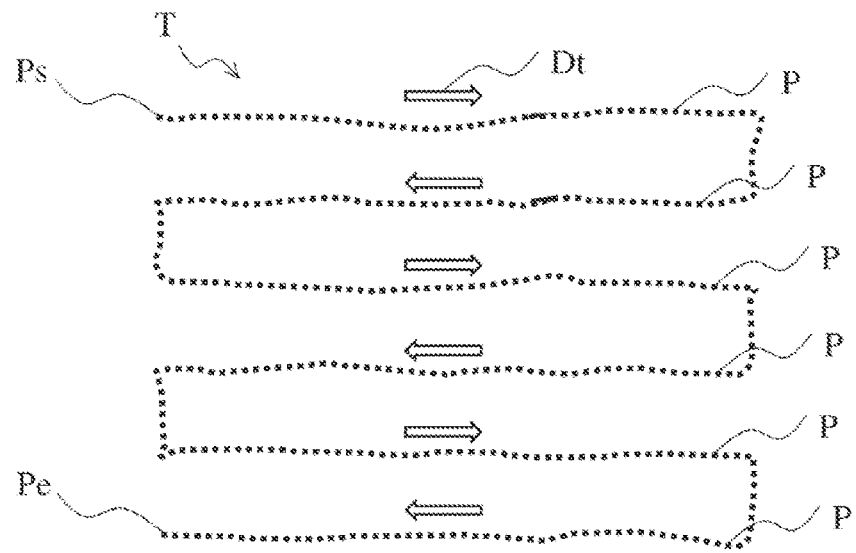
FIG. 5 is a view illustrating one example of a projected image of positions of points included in operation associated data onto a plane in a robot coordinate system.

The operation associated data Dc includes information on the point P of the end effector 120 for every given first time. For example, the point P may be a teaching point. The information on the point P may include information on the three-dimensional position and posture of the end effector 120 at this point, and information indicative of the time-series order which is the order of arriving at the point P. Below, "the three-dimensional position and the three-dimensional posture of the end effector 120 included in the point P" may be expressed as "the three-dimensional position and the three-dimensional posture at the point P." FIG. 5 is a view illustrating one example of a projected image of positions of points P included in the operation associated data Dc onto RxRz plane in the robot coordinate system. As illustrated in FIG. 5, the operation associated data Dc includes a large number of points P. The route direction Dt illustrated by white arrows indicates the order of the end effector 120 arriving at the point P. Since the moving route T which the large number of points P draw along the white arrow is influenced by the operation given to the operation terminal 310 by the user U, which includes the shake of the hand and other habits of the user U during the operation, it may not draw a simple line shape, such as a straight line, an arc, and a simple algebraic curve, including, for example, a second-order curve.

The start/end point extracting part 502 extracts a start point extracting point Ps which is located at a start point of the moving route of the large number of points P, and an end point extracting point Pe which is located at an end point of the moving route, from the large number of points P of the operation associated data Dc, and stores these information in the memory part 520 as extracted data Dd. As illustrated in FIG. 5, the start point extracting point Ps is a first point of the time-series order of the point P, and the end point extracting point Pe is a final point of the time-series order of the points P. The start point extracting point Ps is one example of a start point teaching point and a reference teaching point, and the end point extracting point Pe is one example of an end point teaching point and the reference teaching point.

The first interval determining part 503 determines the given first interval which is an interval of the points P to be compared in order to extract a first extracting point PM. For example, the given first interval is represented by a quantity of the interval of adjacent points P. The first interval determining part 503 determines the given first interval stored beforehand in the memory part 520 or the given first interval inputted into the information processor 500 by the user U, as the given first interval to be used, and stores the given first interval in the memory part 520 as the setting data db. The first interval determining part 503 determines, for the point P to be determined for whether it is the first extracting point, a given first preceding interval which is a given first interval preceding this point P in the route direction Dt, and a given first succeeding interval which is a given first interval succeeding this point P in the route direction Dt. The given first preceding interval and the given first succeeding interval include one or more intervals between the adjacent points P. In this embodiment, the given first preceding interval and the given first succeeding interval are the same, and include two or more intervals between the points P.

The first extracting part 504 extracts the first extracting point PM having a feature related to a change of the end effector 120 in the moving direction from all the points P of the operation associated data Dc. The first extracting point PM is a point of which an amount of change of the end effector 120 in the moving direction is equal to or more than a first threshold at the first extracting point PM. The first extracting part 504 determines a point PA to be determined for whether it is the first extracting point, as the first extracting point PM, when the amount of change at this point PA from a first moving direction D1 to a second moving direction D2 is equal to or more than the first threshold. The first extracting part 504 determines the first threshold stored beforehand in the memory part 520, or the first threshold inputted into the information processor 500 by the user U, as the first threshold to be used, and stores the first threshold in the memory part 520 as the setting data db. The first extracting point PM is one example of the reference teaching point.

Figure 6:
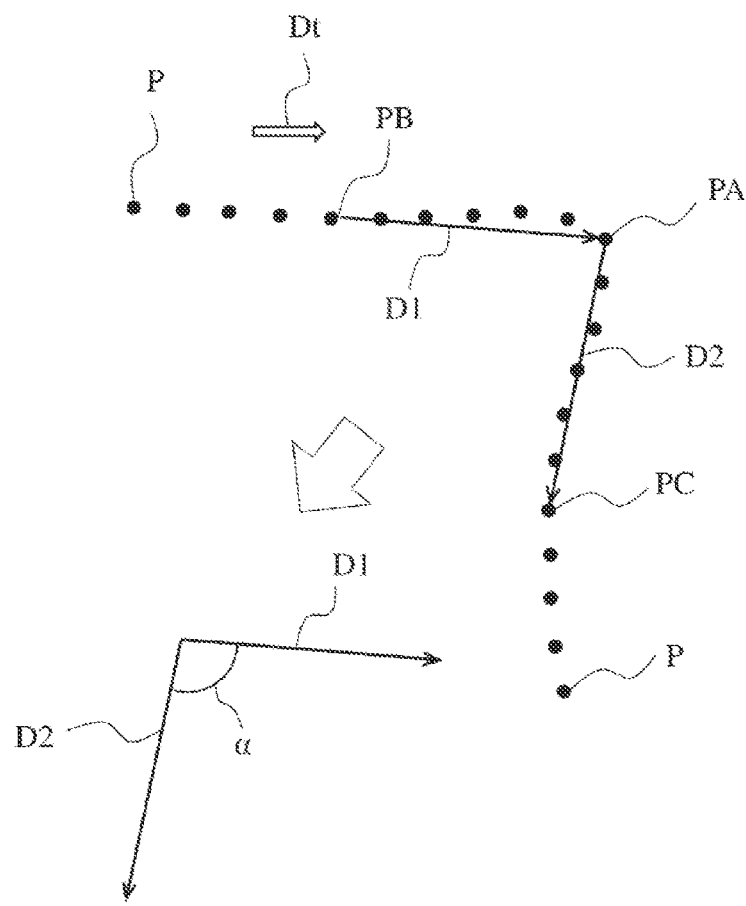
FIG. 6 is a view illustrating one example of a method of extracting a first extracting point, similarly to FIG. 5.

For example, as illustrated in FIG. 6, the first moving direction D1 is a direction of a direction vector which goes from the three-dimensional position of a point PB to the three-dimensional position of the to-be-determined point PA. The second moving direction D2 is a direction of a direction vector which goes from the three-dimensional position of the to-be-determined point PA to the three-dimensional position of a point PC. FIG. 6 is a view illustrating one example of a method of extracting the first extracting point PM, similarly to FIG. 5. The point PB is a point that precedes the to-be-determined point PA in the route direction Dt by the given first preceding interval. The point PC is a point that succeeds the to-be-determined point PA in the route direction Dt by the given first succeeding interval. In FIG. 6, the given first preceding interval and the given first succeeding interval are both 6. In this embodiment, the amount of change in the moving direction is an angle α which the second moving direction D2 forms with respect to the first moving direction D1. The angle α is also an angle which is formed between the direction vector of the first moving direction D1 and the direction vector of the second moving direction D2, and, for example, it is an interior angle. When the angle α is equal to or more than the first threshold, the first extracting part 504 determines the to-be-determined point PA to be the first extracting point PM. The first extracting part 504 stores the information on the first extracting point PM and the information on the amount of change (for example, the information on the angle α) in the memory part 520, as the extracted data Dd.

The first area determining part 505 determines a first extracting area AM. The first extracting area AM is an area within a given distance range from a reference point. The first area determining part 505 determines a distance range of the first extracting area AM stored beforehand in the memory part 520, or a distance range of the first extracting area AM inputted into the information processor 500 by the user U, as the distance range of the first extracting area AM to be used, and stores this distance range of the first extracting area AM in the memory part 520 as the setting data db.

Figure 7:
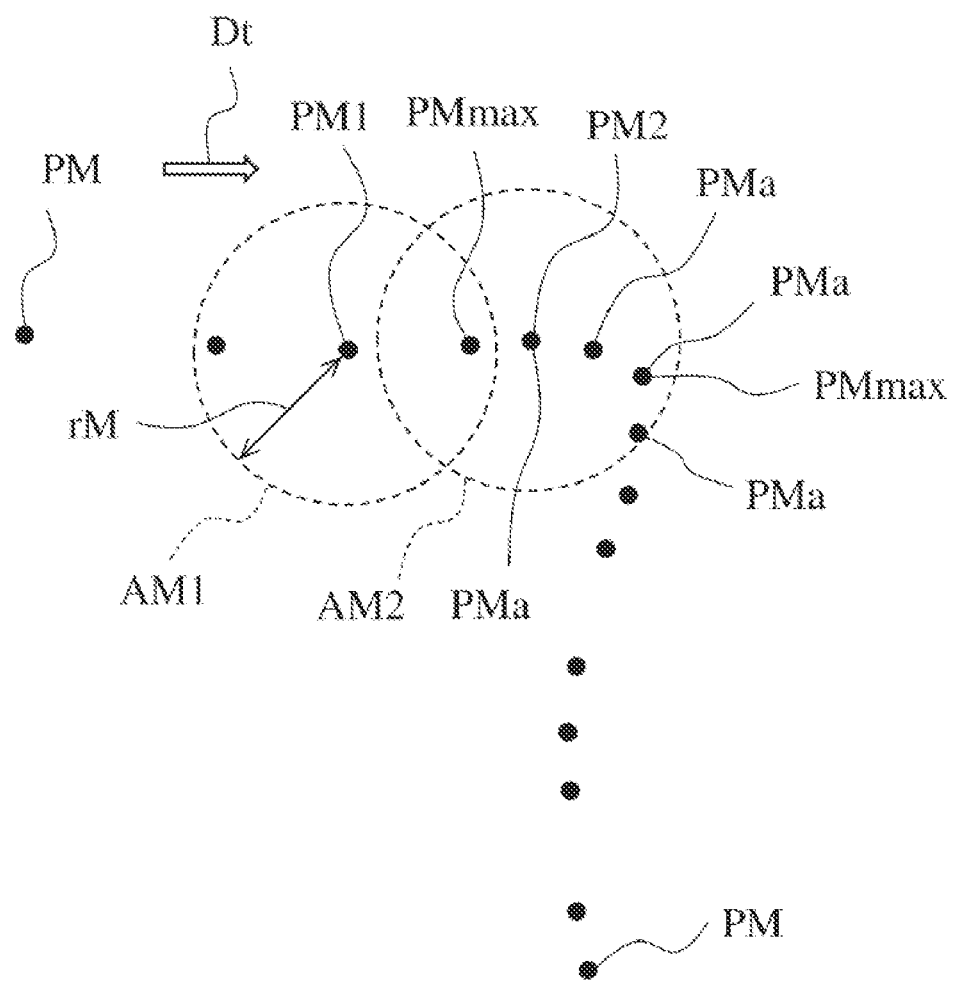
FIG. 7 is a view illustrating one example of a method of setting a first extracting area, similarly to FIG. 5.

The first area determining part 505 sets the first extracting area AM for the first extracting point PM, and extracts the first extracting point PM included in the first extracting area AM. As illustrated in FIG. 7, in this embodiment, the first extracting area AM is a spherical area of a radius rM in which the position of the first extracting point PM is the reference point and the reference point is the center. FIG. 7 is a view illustrating one example of a method of setting the first extracting area AM, similarly to FIG. 5.

Further, the first area determining part 505 determines the reference point of a first extracting area AM2 which is adjacent in the route direction Dt to the first extracting area AM1 in which the first extracting point PM1 is the reference point, as the position of a first extracting point PM2 that immediately succeeds the first extracting area AM1 in the route direction Dt. Therefore, between the first extracting area AM1 and the first extracting area AM2, there is no first extracting point PM which is included in neither area. Below, the "first extracting area AM1" may be expressed as the "first preceding extracting area AM1," and the "first extracting area AM2" may be expressed as the "first succeeding extracting area AM2."

Thus, the first area determining part 505 sequentially sets the first extracting area AM to the first extracting point PM along the route direction Dt. The reference point of the first succeeding extracting area AM2 is not limited to the first extracting point PM2, and, for example, it may be set as the position of an arbitrary first extracting point PM that succeeds the first preceding extracting area AM1 in the route direction Dt. For example, the reference point of the first succeeding extracting area AM2 may be set as the position of the first extracting point PM included in the area of the distance range which is away from the first preceding extracting area AM1 by the distance rM, among the first extracting points PM that succeed the first preceding extracting area AM1 in the route direction Dt. Therefore, there may be an overlapping area between the first preceding extracting area AM1 and the first succeeding extracting area AM2. The two methods of setting the reference point may be combined.

Further, among the first extracting points PM included in the first succeeding extracting area AM2, the first area determining part 505 extracts a first extracting point PMa, by excluding the first extracting points PM which have already been extracted by the processing for the first preceding extracting area AM1 and the first extracting areas AM preceding the first preceding extracting area AM1. The first extracting areas AM same as or preceding the first preceding extracting area AM1 includes the first preceding extracting area AM1, and the first extracting area AM that precedes the first preceding extracting area AM1 in the route direction Dt. That is, the first area determining part 505 extracts the first extracting point PMa same as or succeeding the first extracting point PM2 which is the reference point, among the first extracting points PM included in the first succeeding extracting area AM2. The first extracting point PMa same as or succeeding the first extracting point PM2 includes the first extracting point PM2, and the first extracting point PM that succeeds the first extracting point PM2 in the route direction Dt. Therefore, the same first extracting point PM will not be extracted for two or more first extracting areas AM in a redundant manner.

The first specification extracting part 506 extracts a first specific extracting point PMmax having a further remarkable feature related to the change of the end effector 120 in the moving direction from the first extracting points PM. The first specification extracting part 506 extracts, for the first extracting area AM, the first extracting point PMa of which the angle α of the direction vector which is the amount of change in the moving direction is the maximum, as the first specific extracting point PMmax, from the first extracting points PMa extracted by the first area determining part 505. For each first extracting area AM, at least one first specific extracting point PMmax is extracted. The first specification extracting part 506 stores information on the first specific extracting point PMmax in the memory part 520, as the extracted data Dd. The first specific extracting point PMmax is one example of the reference teaching point.

The second interval determining part 507 determines a given second interval which is the interval of the points P to be compared in order to extract a second extracting point PP. For example, the given second interval is expressed by the quantity of the interval of the adjacent points P. The second interval determining part 507 determines the given second interval stored beforehand in the memory part 520, or the given second interval inputted into the information processor 500 by the user U, as the given second interval to be used, and stores the given second interval in the memory part 520 as the setting data db. The second interval determining part 507 determines, for the point PA to be determined for whether it is the second extracting point, a given second preceding interval which is the given second interval preceding the point PA in the route direction Dt, or the given second succeeding interval which is the given second interval succeeding the point P in the route direction Dt. The given second preceding interval and the given second succeeding interval include one or more intervals between the adjacent points P. In this embodiment, the given second preceding interval and the given second succeeding interval include two or more intervals between the points P. The given second preceding interval and the given second succeeding interval may be the same as or may be different from the given first preceding interval and the given first succeeding interval.

The second extracting part 508 extracts the second extracting point PP having a feature related to a change in the posture of the end effector 120 from all the points P of the operation associated data Dc. The second extracting point PP is a point of which an amount of change in the posture of the end effector 120 at the second extracting point PP is equal to or more than a second threshold. In this embodiment, the posture of the end effector 120 is expressed by the spraying direction Di of the end effector 120. The second extracting part 508 determines the second threshold stored beforehand in the memory part 520, or the second threshold inputted into the information processor 500 by the user U, as the second threshold to be used, and stores the second threshold in the memory part 520 as the setting data db. The second extracting point PP is one example of the reference teaching point.

Figure 8:
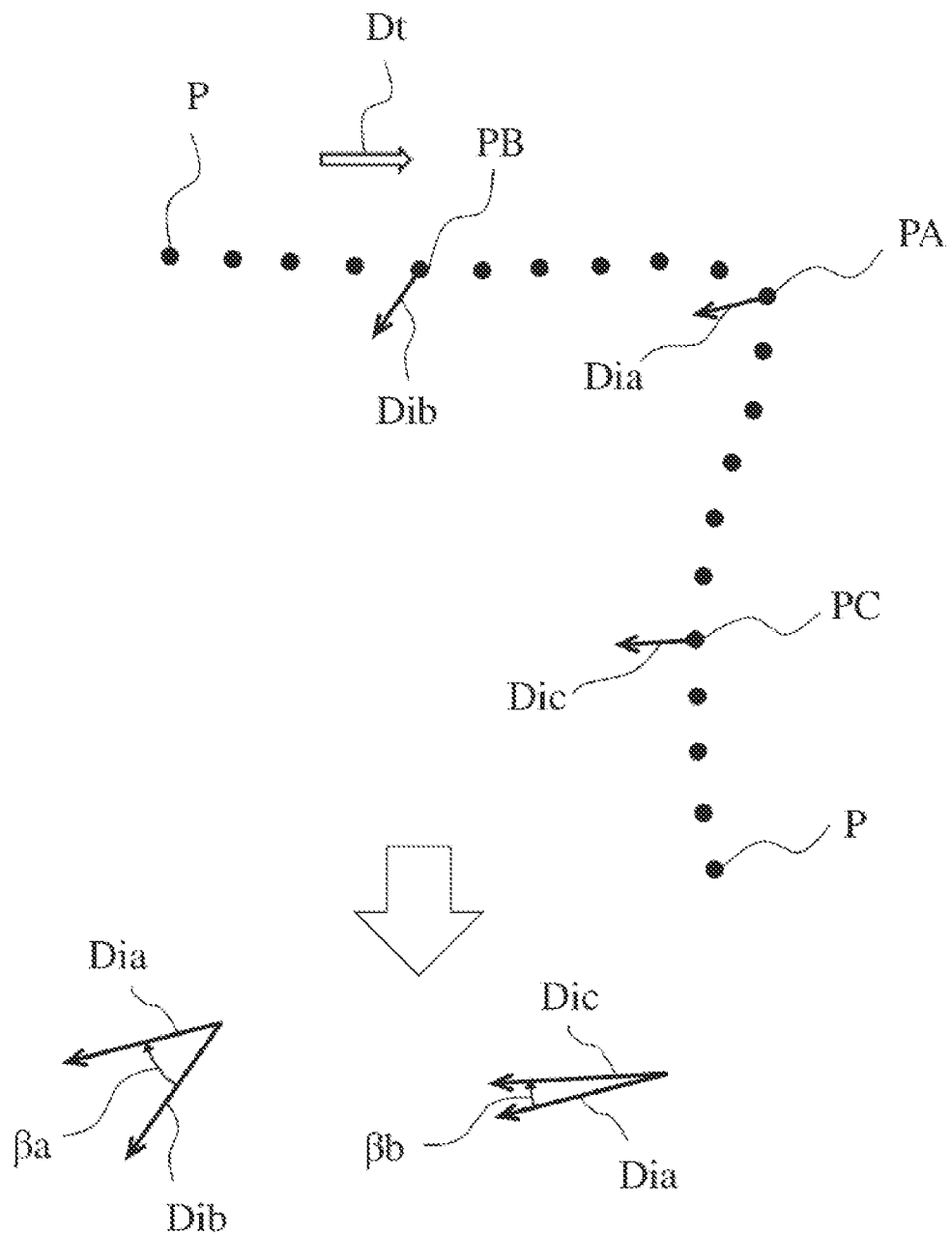
FIG. 8 is a view illustrating one example of a method of extracting a second extracting point, similarly to FIG. 5.

For example, as illustrated in FIG. 8, the second extracting part 508 compares, for the point PA to be determined for whether it is the second extracting point, an amount of change in the posture from the three-dimensional posture at the point PB, which precedes the point PA in the route direction Dt by the given second preceding interval, to the three-dimensional posture at the point PA, or an amount of change in the posture from the three-dimensional posture at the point PA to the three-dimensional posture at the point PC, which succeeds the point PA in the route direction Dt by the given second succeeding interval, with the second threshold. FIG. 8 is a view illustrating one example of a method of extracting the second extracting point PP, similarly to FIG. 5. In FIG. 8, the given second preceding interval and the given second succeeding interval are both 6.

In this embodiment, the amount of change in the posture is an angle βa of a spraying direction Dia at the to-be-determined point PA with respect to a spraying direction Dib at the point PB, or an angle βb of a spraying direction Dic at the point PC with respect to the spraying direction Dia at the to-be-determined point PA. The angle βa is also an angle formed between the direction vector of the spraying direction Dib and the direction vector of the spraying direction Dia (for example, an interior angle). The angle βb is also an angle formed between the direction vector of the spraying direction Dia and the direction vector of the spraying direction Dic (for example, an interior angle). The second extracting part 508 determines the point P to be determined as the second extracting point PP, when the angle βa or the angle βb is equal to or more than the second threshold. The second extracting part 508 stores information on the second extracting point PP and information on the amount of change (for example, information on the angle βa or the angle βb) in the memory part 520 as the extracted data Dd. The selection of the angle βa or the angle βb may be set beforehand, or may be determined by the second extracting part 508 etc. according to the command inputted into the information processor 500 by the user U.

The second area determining part 509 determines a second extracting area AP. The second extracting area AP is an area within a given distance range from a reference point. The second area determining part 509 determines the distance range of the second extracting area AP stored beforehand in the memory part 520, or the distance range of the second extracting area AP inputted into the information processor 500 by the user U, as the distance range of the second extracting area AP to be used, and stores the distance range of the second extracting area AP in the memory part 520 as the setting data db. The distance range of the second extracting area AP may be the same as or may differ from the distance range of the first extracting area AM.

Figure 9:
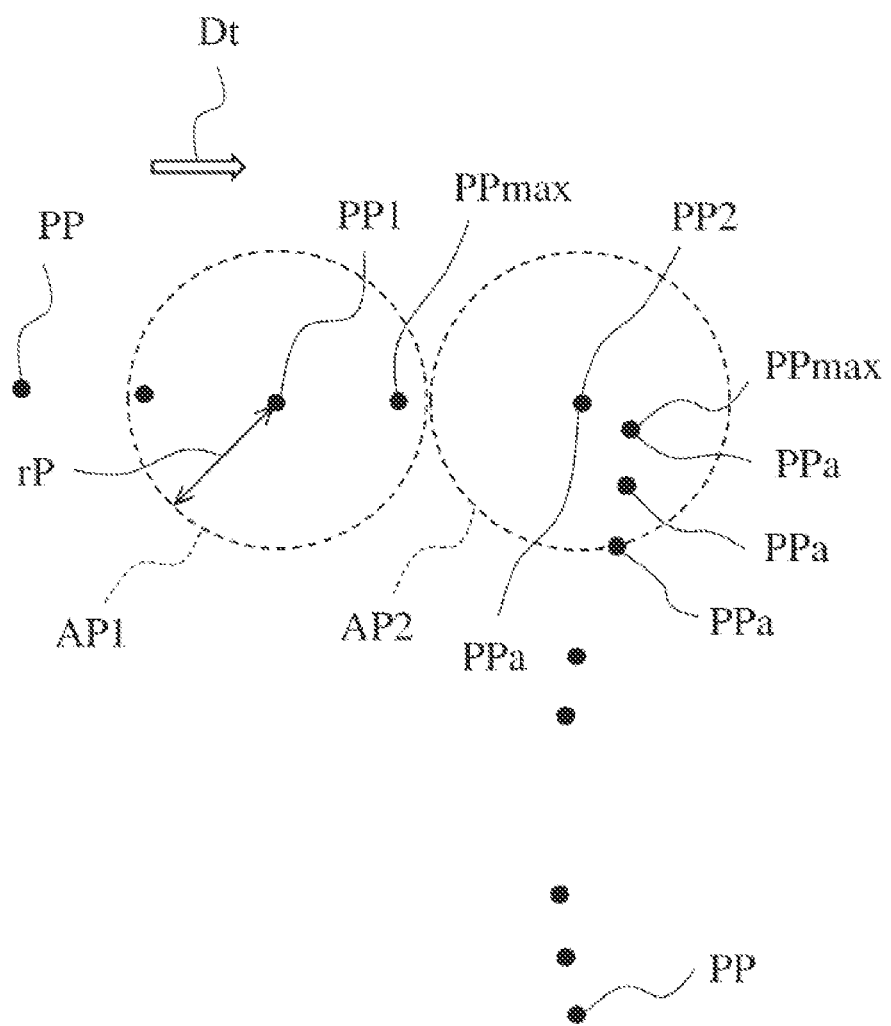
FIG. 9 is a view illustrating one example of a method of setting a second extracting area, similarly to FIG. 5.

The second area determining part 509 sets the second extracting area AP to the second extracting point PP, and extracts the second extracting points PP included in the second extracting area AP. As illustrated in FIG. 9, in this embodiment, the second extracting area AP is a spherical area of a radius rP centering on a reference point which is the position of the second extracting point PP. FIG. 9 is a view illustrating one example of a method of setting the second extracting area AP similarly to FIG. 5.

Further, the second area determining part 509 determines the reference point of a second extracting area AP2 which is adjacent in the route direction Dt to a second extracting area AP1 in which a second extracting point PP1 is the reference point, as the position of a second extracting point PP2 that immediately succeeds the second extracting area AP1 in the route direction Dt. Therefore, between the second extracting area AP1 and the second extracting area AP2, there is no second extracting point PP that is included in neither area. Below, "the second extracting area AP1" may also be expressed as "the second preceding extracting area AP1," and "the second extracting area AP2" may also be expressed as "the second succeeding extracting area AP2."

Thus, the second area determining part 509 sequentially sets the second extracting area AP to the second extracting point PP along the route direction Dt. The reference point of the second succeeding extracting area AP2 is not limited to the second extracting point PP2, and, for example, it may be set as the position of an arbitrary second extracting point PP that succeeds the second preceding extracting area AP1 in the route direction Dt. For example, the reference point of the second succeeding extracting area AP2 may be set as the position of the second extracting point PP included in an area of the distance range which is away from the second preceding extracting area AP1 by the distance rP, among the second extracting points PP that succeeds the second preceding extracting area AP1 in the route direction Dt. Therefore, there may be an overlapping area between the second preceding extracting area AP1 and the second succeeding extracting area AP2. The two methods of setting the reference point described above may be combined.

Further, among the second extracting points PP included in the second succeeding extracting area AP2, the second area determining part 509 extracts a second extracting point PPa, by excluding the second extracting points PP which have already been extracted by the processing for the second preceding extracting area AP1 and the second extracting areas AP that precedes the second preceding extracting area AP1. That is, the second area determining part 509 extracts the second extracting points PPa same as or succeeding the second extracting point PP2 which is the reference point, among the second extracting points PP included in the second succeeding extracting area AP2. Therefore, the same second extracting point PP will not be extracted for two or more second extracting areas AP in a redundant manner.

The second specification extracting part 510 extracts a second specific extracting point PPmax having a further remarkable feature related to the change in the posture of the end effector 120 from the second extracting points PP. The second specification extracting part 510 extracts, for each second extracting area AP, the second extracting point PPa of which an amount of change in the posture is the maximum, from the second extracting points PPa extracted by the second area determining part 509, as the second specific extracting point PPmax. In each second extracting area AP, at least one second specific extracting point PPmax is extracted. The second specification extracting part 510 stores information on the second specific extracting point PPmax in the memory part 520 as the extracted data Dd. The second specific extracting point PPmax is one example of the reference teaching point.

The thinning extracting part 511 extracts points P which are located at every given third interval which is a given point interval, from all the points P of the operation associated data Dc, as thinning extracting points PT. The given third interval includes two or more intervals between adjacent points P. The thinning extracting part 511 determines the given third interval stored beforehand in the memory part 520, or the given third interval inputted into the information processor 500 by the user U, as the given third interval to be used, and stores the given third interval in the memory part 520 as the setting data db. For example, the thinning extracting part 511 may acquire information on the start point extracting point Ps from the start/end point extracting part 502, and may extract the thinning extracting points PT from the start point extracting point Ps at every given third interval. The point P at which the extraction of the thinning extracting point PT is started may be set arbitrarily. The thinning extracting point PT is one example of the reference teaching point.

The integrating part 512 integrates the extracted data Dd. In detail, the integrating part 512 generates target data De which includes the start point extracting point Ps, the end point extracting point Pe, the first specific extracting point PMmax, the second specific extracting point PPmax, and the thinning extracting point PT as target points TP of the end effector 120, and stores it in the memory part 520. At the target point TP, when two or more among the start point extracting point Ps, the end point extracting point Pe, the first specific extracting point PMmax, the second specific extracting point PPmax, and the thinning extracting point PT overlap with each other, the integrating part 512 keeps only one point P of the at least two points, and deletes other points P. That is, the integrating part 512 deletes the overlapping points P at the target point TP.

The control data generating part 513 converts the target data De into the control data Df which is available for the control program of the robot controller 200, and stores the control data Df in the memory part 520. For example, the control data generating part 513 generates the teaching data (i.e., the second teaching data) as the control data Df. The control data generating part 513 may be configured to send the control data Df to the robot controller 200.

[Operation of Information Processor]

Figure 10:
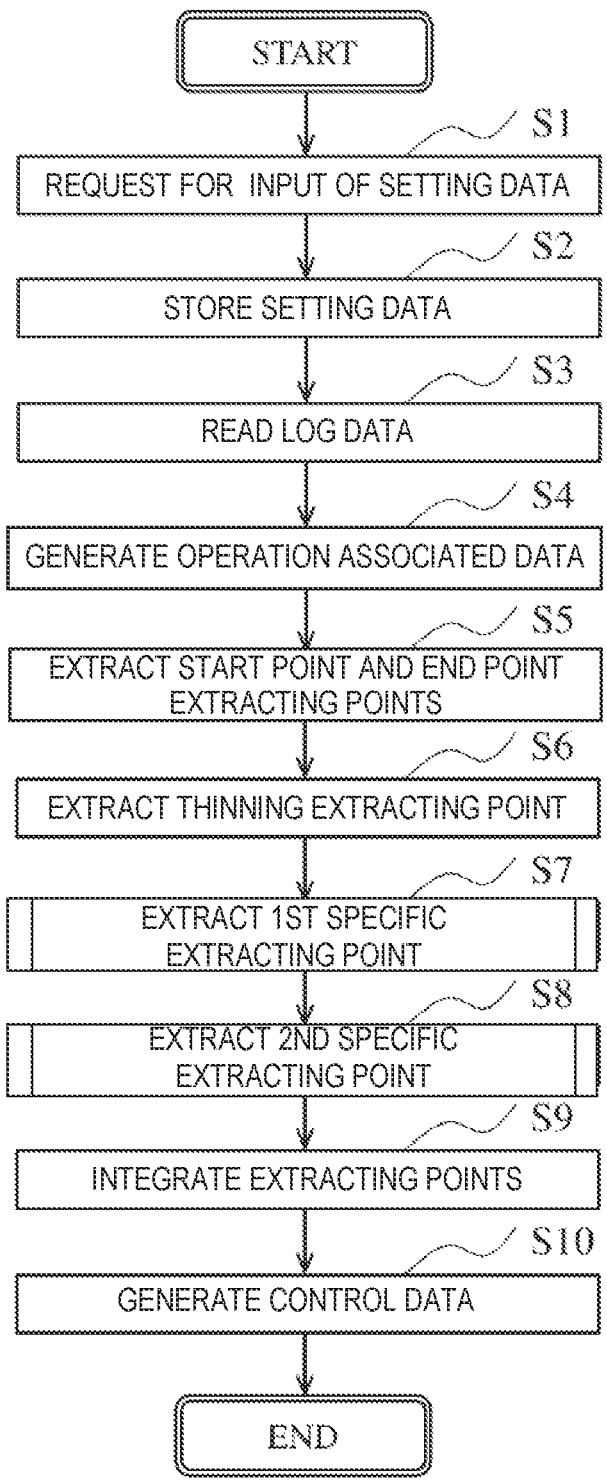
FIG. 10 is a flowchart illustrating one example of operation of the information processor according to this embodiment.

One example of operation of the information processor 500 according to this embodiment is described. FIG. 10 is a flowchart illustrating one example of the operation of the information processor 500 according to this embodiment. Below, one example, in which the setting data db, such as the given interval, the distance range of the extracting area, and the threshold, are inputted into the information processor 500 by the user U, and the inputted setting data db is used by the information processor 500, is described.

Figure 11:
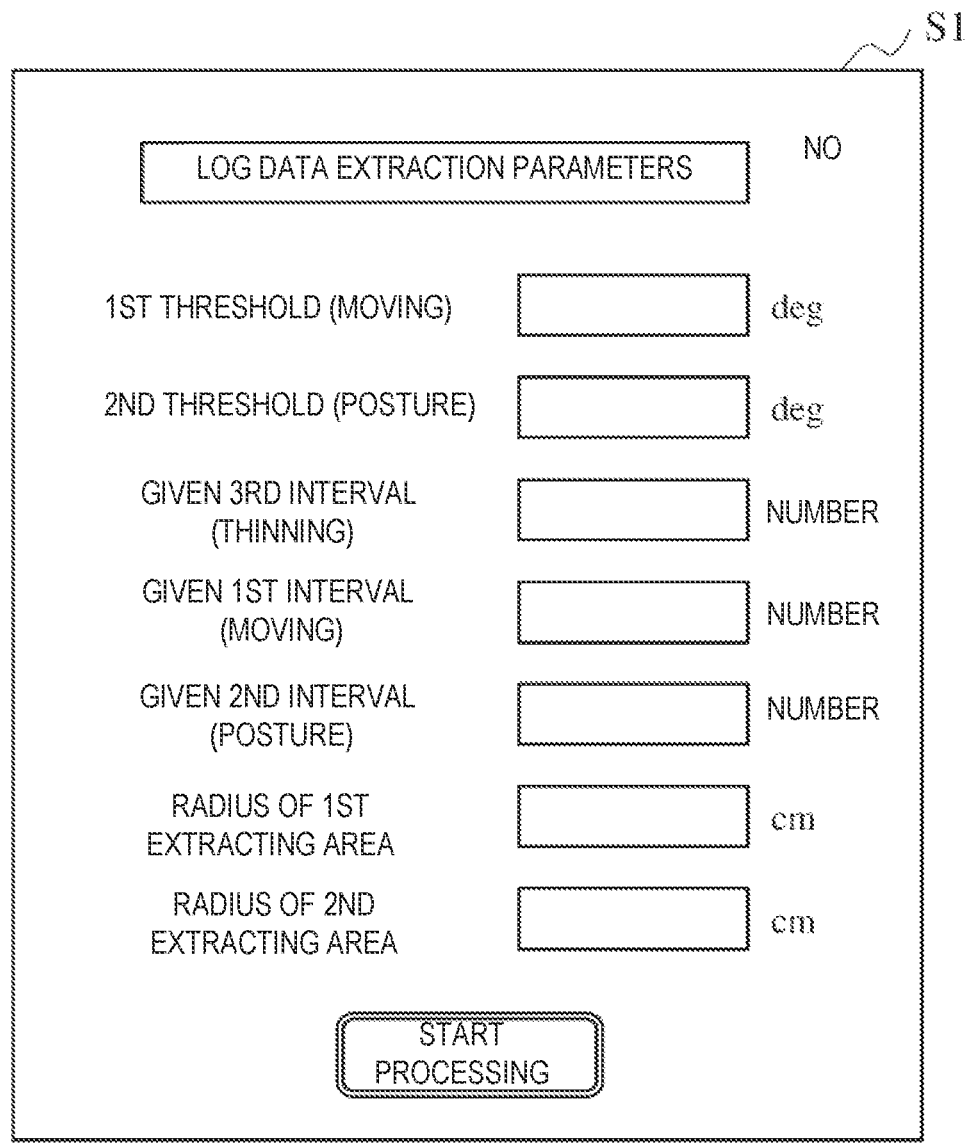
FIG. 11 is a view illustrating one example of a screen of the information processor which requests an input of setting data.

As illustrated in FIG. 10, the information processor 500 requests the user U for an input of the setting data db, when the processing is started (Step S1). For example, FIG. 11 is a view illustrating one example of a screen of the information processor 500 which requests the input of the setting data db. As illustrated in FIG. 11, the information processor 500 displays a screen S1 which requests the input of the setting data db on the display unit of the information processor 500. The screen S1 indicates a request of the input of the given first, second, and third intervals, the distance ranges of the first and second extracting areas, and the first and second thresholds.

Next, when the setting data db is inputted by the user U and a command for the processing start is inputted, the information processor 500 stores the setting data db in the memory part 520 (Step S2).

Next, the information processor 500 reads the log data Da stored in the memory part 520 (Step S3). Next, the information processor 500 generates the operation associated data Dc from the log data Da (Step S4). For example, the operation associated data Dc includes the information on the large number of points P as illustrated in FIG. 5.

Next, the information processor 500 extracts the start point extracting point Ps and the end point extracting point Pe from all the points P included in the operation associated data Dc, and stores them in the memory part 520 (Step S5).

Next, the information processor 500 extracts the thinning extracting point PT from all the points P included in the operation associated data Dc, and stores it in the memory part 520 (Step S6).

Next, the information processor 500 extracts the first specific extracting point PMmax from all the points P included in the operation associated data Dc, and stores it in the memory part 520 (Step S7). The details of Step S7 will be described later.

Next, the information processor 500 extracts the second specific extracting point PPmax from all the points P included in the operation associated data Dc, and stores it in the memory part 520 (Step S8). The details of Step S8 will be described later.

Figure 12:
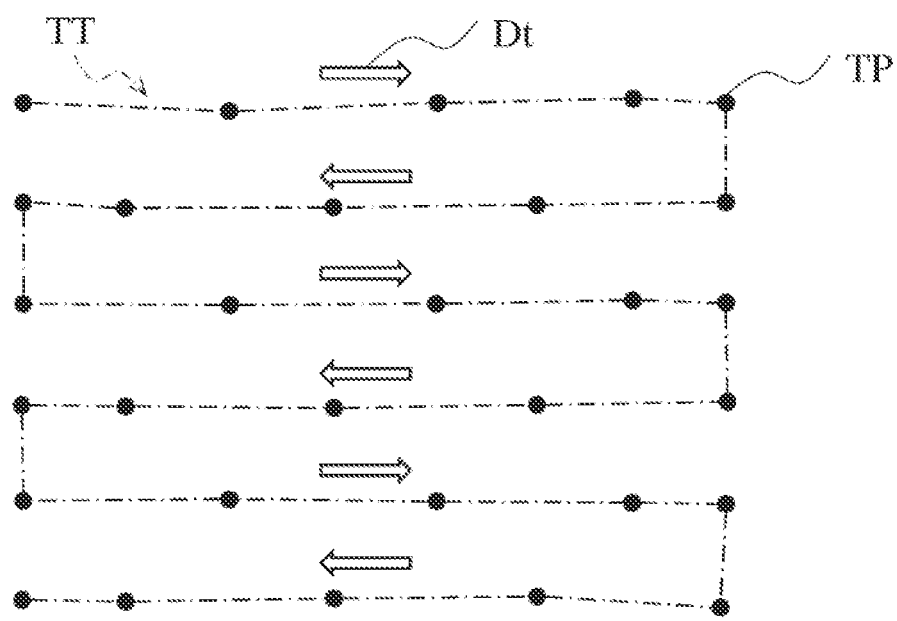
FIG. 12 is a view illustrating one example of a target point and a target route, similarly to FIG. 5.

Next, the information processor 500 integrates all the extracting points to generate the target data De including the target point TP, and stores it in the memory part 520 (Step S9). In detail, the information processor 500 uses the start point extracting point Ps, the end point extracting point Pe, the thinning extracting point PT, the first specific extracting point PMmax, and the second specific extracting point PPmax, as the target points TP, and deletes the overlap of the extracting points. Therefore, the target data De includes, for example, target points TP as illustrated in FIG. 12. FIG. 12 is a view illustrating one example of the target point TP and a target route TT, similarly to FIG. 5. The target points TP form the target route TT which is constituted by a simple line shape, with a quantity significantly smaller than the quantity of points P of the operation associated data Dc. Further, the target point TP includes features related to changes in the moving direction and/or the posture of the end effector 120.

Next, the information processor 500 generates the control data Df using the target data De, and stores it in the memory part 520 (Step S10). For example, the information processor 500 generates teaching data including the teaching point corresponding to the target point TP as the control data Df. Such teaching data has a simple configuration reflecting the features of the moving direction and the posture of the end effector 120 which are included in the log data Da with sufficient accuracy. Therefore, for example, when the user U tries to correct the teaching data, the teaching data using the target data De makes the correction easier than the teaching data using the log data Da.

The order of the processings of Steps S5-S8 is not limited to the order in FIG. 10, but it may be any kind of order. At least two of the processings of Steps S5-S8 may be performed in parallel.

Figure 13:
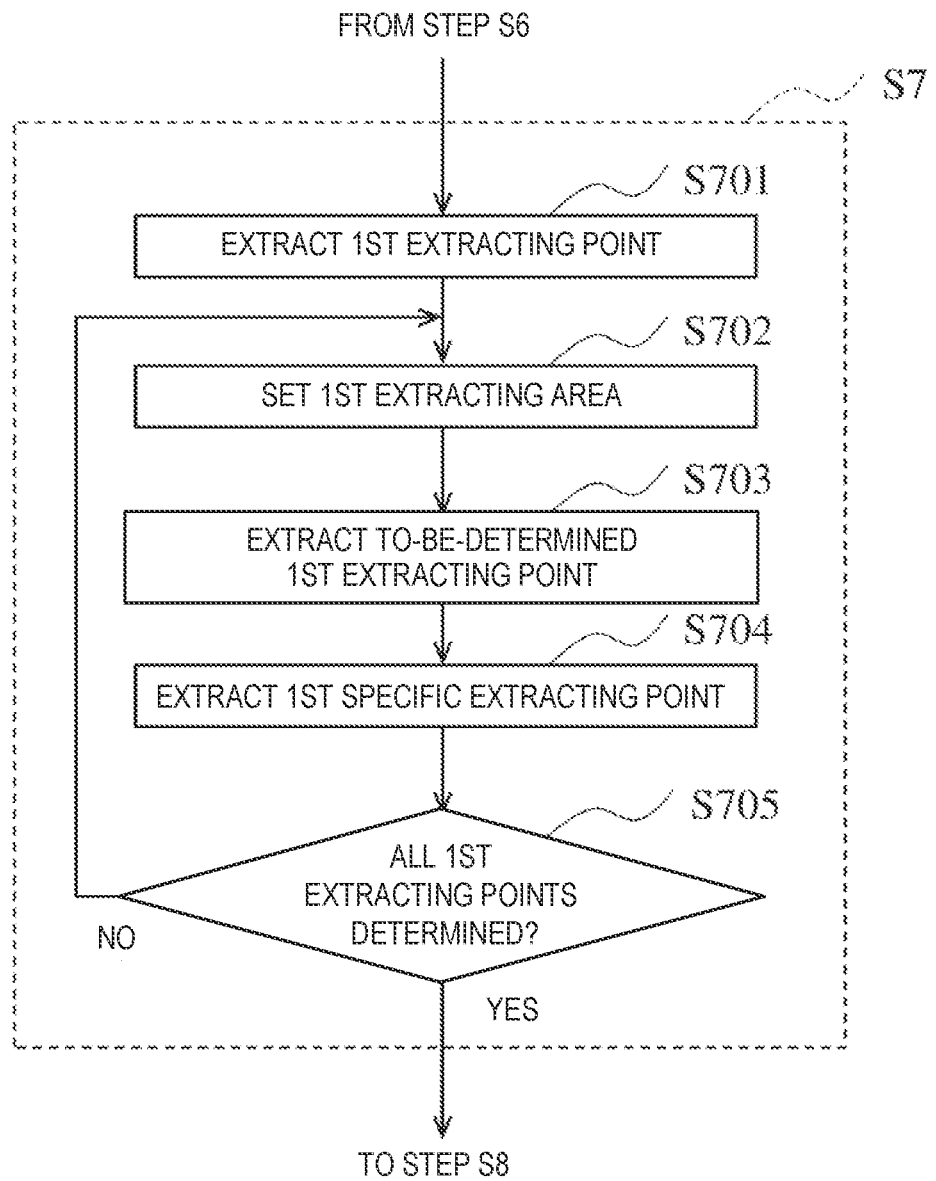
FIG. 13 is a flowchart illustrating one example of processing of Step S7 in FIG. 10.

The details of the processing of Step S7 in FIG. 10 are described. FIG. 13 is a flowchart illustrating one example of the processing of Step S7 in FIG. 10. As illustrated in FIG. 13, the processing of Step S7 includes the processings of Steps S701-S705.

First, the information processor 500 extracts the first extracting point PM from all the points P included in the operation associated data Dc, and stores it in the memory part 520 (Step S701).

Next, the information processor 500 sets the first extracting area AM to the first extracting point PM (Step S702). The information processor 500 sets the first extracting area AM to one of the first extracting points PM which have not been the determination targets for the extraction in all the first extracting areas AM processed before the first extracting area AM.

Next, the information processor 500 extracts the first extracting point PMa which is the determination target for the extraction, from the first extracting area AM (Step S703). The information processor 500 extracts the first extracting point PMa which has not been the determination targets for the extraction in all the first extracting areas AM processed before the first extracting area AM, from the first extracting points PM included in the first extracting area AM.

Next, the information processor 500 extracts the first specific extracting point PMmax which is the maximum in the amount of change in the moving direction from the first extracting points PMa extracted at Step S703, and stores it in the memory part 520 (Step S704).

Next, the information processor 500 determines whether all the first extracting points PM have already been determined for the extraction using the first extracting area AM (Step S705). If all the first extracting points PM have already been determined (Yes at Step S705), the information processor 500 transits to Step S8, and if there is a non-determined first extracting point PM (No at Step S705), it returns to Step S702.

By the processings of Steps S701-S705, all the first extracting points PM are determined for the extraction of the first specific extracting point PMmax. The points P included in the operation associated data Dc are thinned out via the extraction of the first extracting points PM, and are further thinned out via the extraction of the first specific extracting point PMmax.

Figure 14:
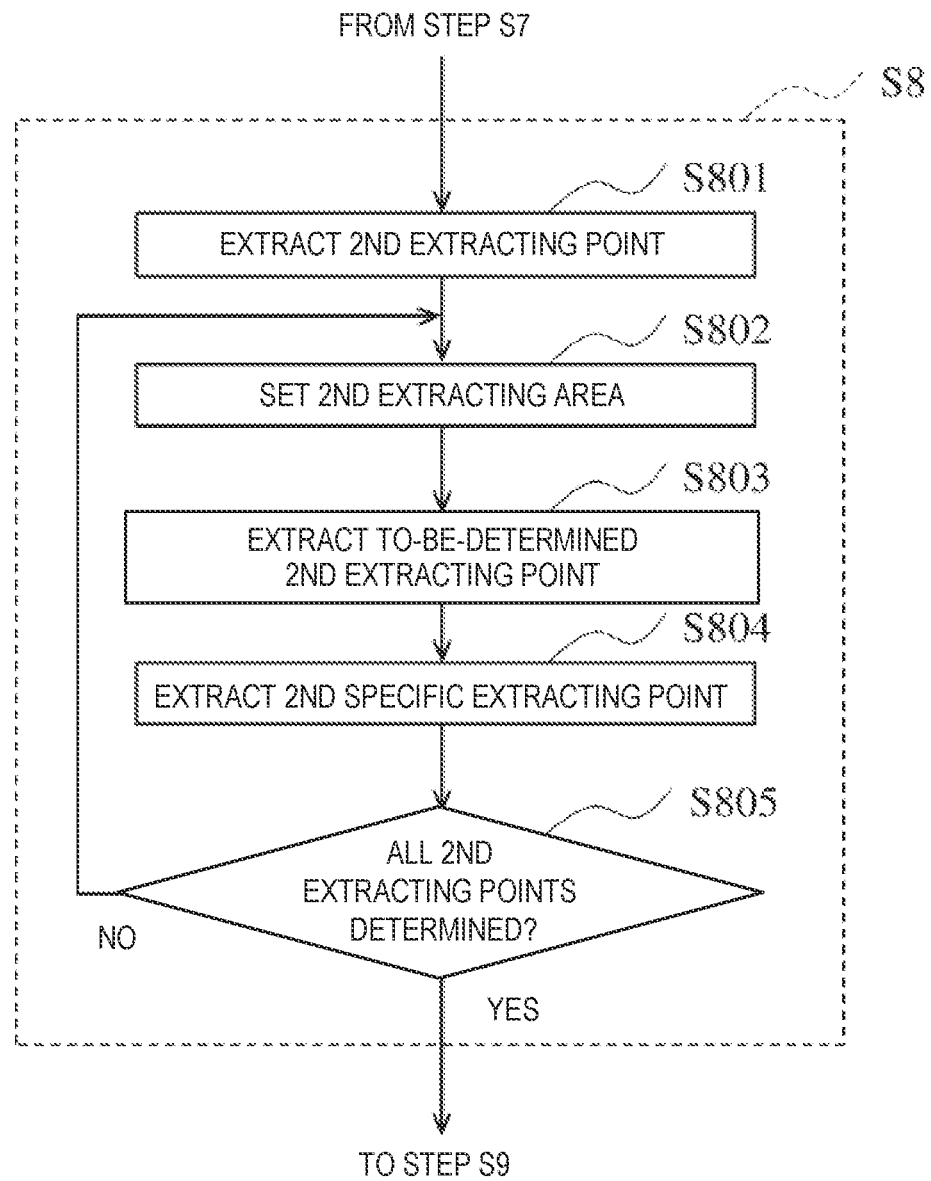
FIG. 14 is a flowchart illustrating one example of processing of Step S8 in FIG. 10.

The details of processing of Step S8 in FIG. 10 are described. FIG. 14 is a flowchart illustrating one example of the processing of Step S8 in FIG. 10. As illustrated in FIG. 14, the processing of Step S8 includes processings of Steps S801-S805.

First, the information processor 500 extracts the second extracting point PP from all the points P included in the operation associated data Dc, and stores it in the memory part 520 (Step S801).

Next, the information processor 500 sets the second extracting area AP to the second extracting point PP (Step S802). The information processor 500 sets the second extracting area AP to one of the second extracting points PP which have not been the determination targets for the extraction in all the second extracting areas AP processed before the second extracting area AP.

Next, the information processor 500 extracts the second extracting point PPa which is the determination target for the extraction, from the second extracting area AP (Step S803). The information processor 500 extracts the second extracting point PPa which has not been the determination target for the extraction in all the second extracting areas AP processed before the second extracting area AP, from the second extracting points PP included in the second extracting area AP.

Next, the information processor 500 extracts the second specific extracting point PPmax which is the maximum in the amount of change in the posture, from the second extracting points PPa extracted at Step S803, and stores it in the memory part 520 (Step S804).

Next, the information processor 500 determines whether all the second extracting points PP have already been determined for the extraction using the second extracting area AP (Step S805). If all the second extracting points PP have been determined (Yes at Step S805), the information processor 500 transits to Step S9, and if there is a non-determined second extracting point PP (No at Step S805), it returns to Step S802.

By the processings of Steps S801-S805, all the second extracting points PP have been determined for the extraction of the second specific extracting point PPmax. The points P included in the operation associated data Dc are thinned out via the extraction of the second extracting points PP, and are further thinned out via the extraction of the second specific extracting point PPmax.

Modification 1

Modification 1 of the exemplary embodiment is described. This modification differs from the embodiment in that the information processor 500 is operable in two processing modes. Below, as for the modification, the difference from the embodiment is mainly described, and explanation of those similar to the embodiment is suitably omitted.

The information processor 500 according to this modification is operable in two processing modes, an extraction processing mode and a specified processing mode. The information processor 500 is configured to operate in a processing mode specified by a command inputted into the information processor 500, and generate the control data according to the specified processing mode. The extraction processing mode is one example of a first processing mode, and the specified processing mode is one example of a second processing mode.

In the extraction processing mode, the information processor 500 extracts the target point TP from a large number of points P of the end effector 120 included in the operation associated data, and generates the target data De by using the target point TP. In the extraction processing mode, the information processor 500 extracts the target point TP, similarly to the embodiment.

In the specified processing mode, the information processor 500 extracts a specified point which is a point specified beforehand, from the large number of points P of the end effector 120 included in the operation associated data, and generates the target data De by using only the specified point as the target point TP. The information on the specified point may include the information on the three-dimensional position and posture of the end effector 120.

The information processor 500 may store in the memory part 520 the information on the specified point set beforehand, or may store in the memory part 520 the information on the specified point inputted into the information processor 500 by the user U. For example, the specified point may be set when the first teaching data is generated in the teaching mode, or may be set by a computer program. The method of setting the specified point is not limited in particular, but may be any kind of method.

For example, when the specified point is set in the teaching mode, the user U may give an input to a trigger button of the operation terminal 310 at a timing when the operation terminal 310 and/or the end effector 120 reach a desired position, in the process of moving the end effector 120 by using the operation terminal 310 in the teaching mode. The operation processor 330 may transmit a signal indicative of the input into the trigger button to the robot controller 200, and the robot controller 200 may generate the log data Da including information on the input timing, such as a time when the input into the trigger button was given. The information processor 500 may detect the three-dimensional position and the three-dimensional posture of the end effector 120 at the input timing, from the drive results of the arm drives M1-M6 at the input timing, included in the log data Da. The information processor 500 may set a point corresponding to the three-dimensional position and the three-dimensional posture of the end effector 120 at the input timing, as the specified point.

Figure 15:
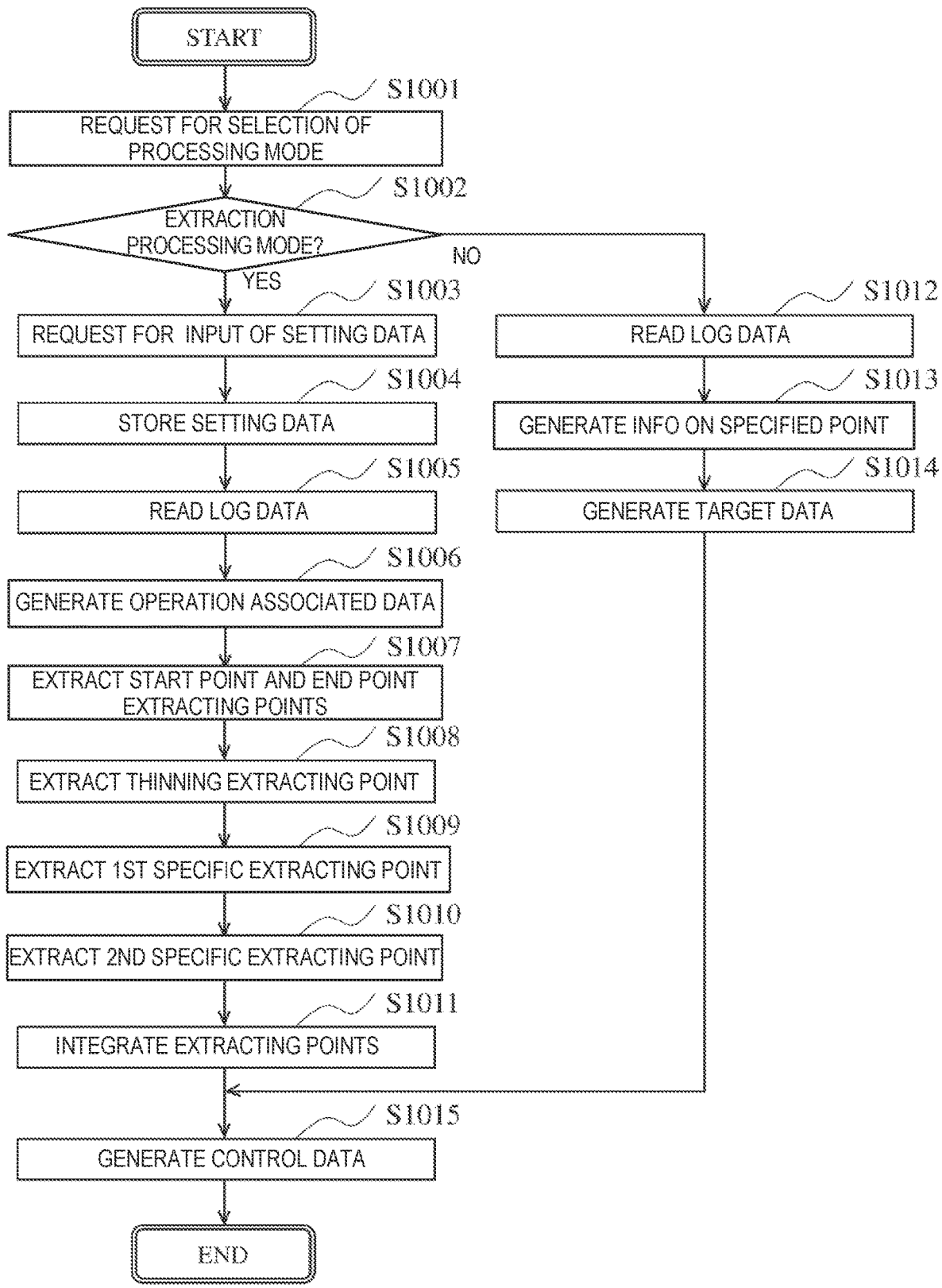
FIG. 15 is a flowchart illustrating one example of operation of an information processor according to Modification 1 of the exemplary embodiment.
Figure 16:
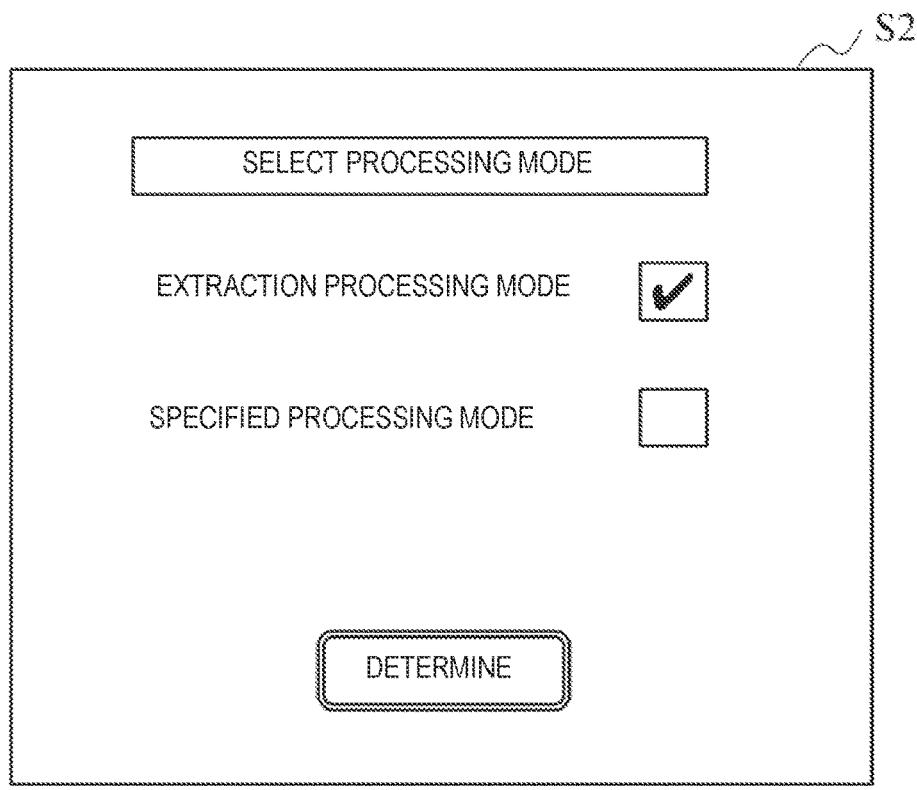
FIG. 16 is a view illustrating one example of a screen of the information processor which requests a selection of a processing mode according to Modification 1.

Operation of the information processor 500 according to this modification is described with reference to FIG. 15. FIG. 15 is a flowchart illustrating one example of the operation of the information processor 500 according to Modification 1 of the exemplary embodiment. When the information processor 500 starts the processing, it then requests the user U for a selection of the processing mode (Step S1001). For example, FIG. 16 is a view illustrating one example of a screen of the information processor 500 which requests the selection of the processing mode according to Modification 1. As illustrated in FIG. 16, the information processor 500 displays a screen S2 which requests an input of the selection of either the extraction processing mode or the specified processing mode on the display unit of the information processor 500.

If the extraction processing mode is selected (Yes at Step S1002), the information processor 500 performs processings of Steps S1003-S1011, and if the specified processing mode is selected (No at Step S1002), it performs processings of Steps S1012-S1014. The processings of Steps S1003-S1011 are similar to the processings of Steps S1-S9 of the embodiment, respectively.

At Step S1012, the information processor 500 reads the log data Da stored in the memory part 520.

Figure 17:
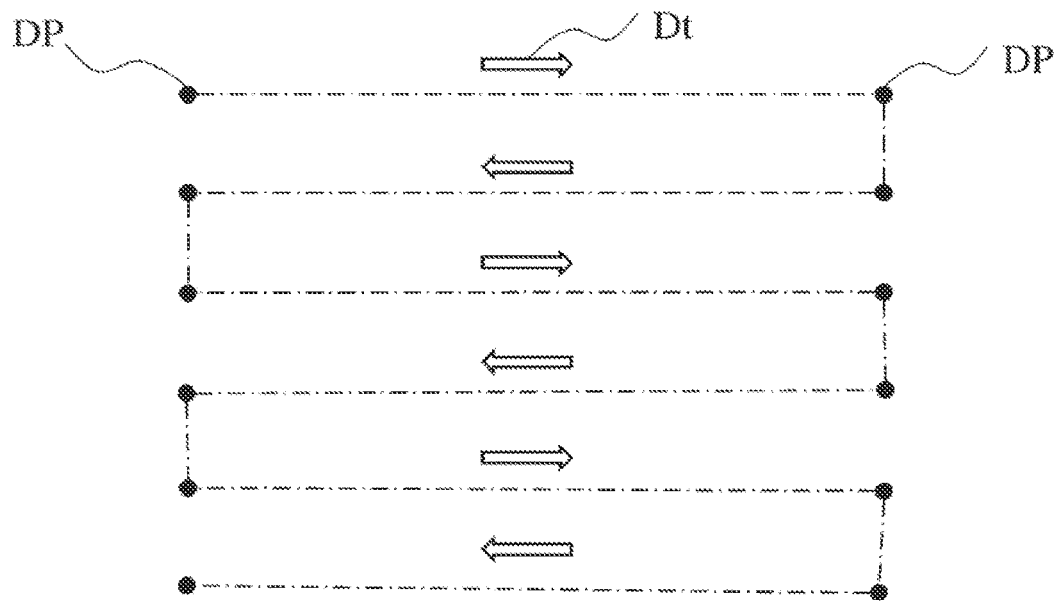
FIG. 17 is a view illustrating one example of a specified point according to Modification 1, similarly to FIG. 5.

Next, the information processor 500 extracts, from the log data Da, data at the input timing when the input into the trigger button of the operation terminal 310 was given, and generates information on a specified point DP by using the extracted data (Step S1013). The information processor 500 stores in the memory part 520 the information on the specified point DP as the operation associated data Dc. For example, the information processor 500 generates information on specified points DP as illustrated in FIG. 17. In FIG. 17, the route direction Dt illustrated by white arrows indicates the order of arriving of the end effector 120 at the specified point DP. FIG. 17 is a view illustrating one example of the specified point according to Modification 1, similarly to FIG. 5.

Next, the information processor 500 generates the target data De which includes information only on the specified point DP as the target point TP, and stores it in the memory part 520 (Step S1014).

At Step S1015, similarly to Step S10 of the embodiment, the information processor 500 generates the control data Df by using the target data De, and stores it in the memory part 520. In the extraction processing mode, the information processor 500 uses the information on the target point TP which is the extracting point extracted from the large number of points P, for the generation processing. In the specified processing mode, the information processor 500 uses the information on the target point TP which is the specified point DP (i.e., the information only on the specified point DP), for the generation processing.

The information processor 500 generates the control data Df in the processing mode specified from the extraction processing mode and the specified processing mode, by performing the processings of Steps S1001-S1015. In the specified processing mode, the information processor 500 may be configured to generate information on the start point extracting point Ps and the end point extracting point Pe from the log data Da, and generate the control data Df by processing the target data De which includes the information on the specified point DP, the start point extracting point Ps, and the end point extracting point Pe, as the information on the target point TP. The information processor 500 may be configured to perform both the extraction processing mode and the specified processing mode.

Modification 2

Modification 2 of the exemplary embodiment is described. This modification differs from the embodiment and Modification 1 in that the information processor 500 is operable in three processing modes. Below, as for the modification, the difference from the embodiment and Modification 1 is mainly described, and explanation of those similar to the embodiment and Modification 1 will be omitted suitably.

The information processor 500 according to this modification is operable in three processing modes of a first extraction processing mode, a second extraction processing mode, and a specified processing mode. The information processor 500 is configured to be operable in a processing mode specified by a command inputted into the information processor 500 to generate control data according to the specified processing mode. The first extraction processing mode is similar to the extraction processing mode of Modification 1, and the specified processing mode is similar to the specified processing mode of Modification 1. The first extraction processing mode is one example of the first processing mode, the specified processing mode is one example of the second processing mode, and the second extraction processing mode is one example of a third processing mode.

In the second extraction processing mode, the information processor 500 generates the target data De using a point extracted from a large number of points P of the end effector 120 included in the operation associated data by performing the processing similar to the embodiment, and the specified point. In detail, the information processor 500 integrates the start point extracting point Ps, the end point extracting point Pe, the thinning extracting point PT, the first specific extracting point PMmax, the second specific extracting point PPmax, and the specified point DP. The information processor 500 deletes the overlap of the points among the above-described points, and determines the point after the deletion as the target point TP. The information processor 500 generates the control data Df using the target data De including the target point TP.

Figure 18:
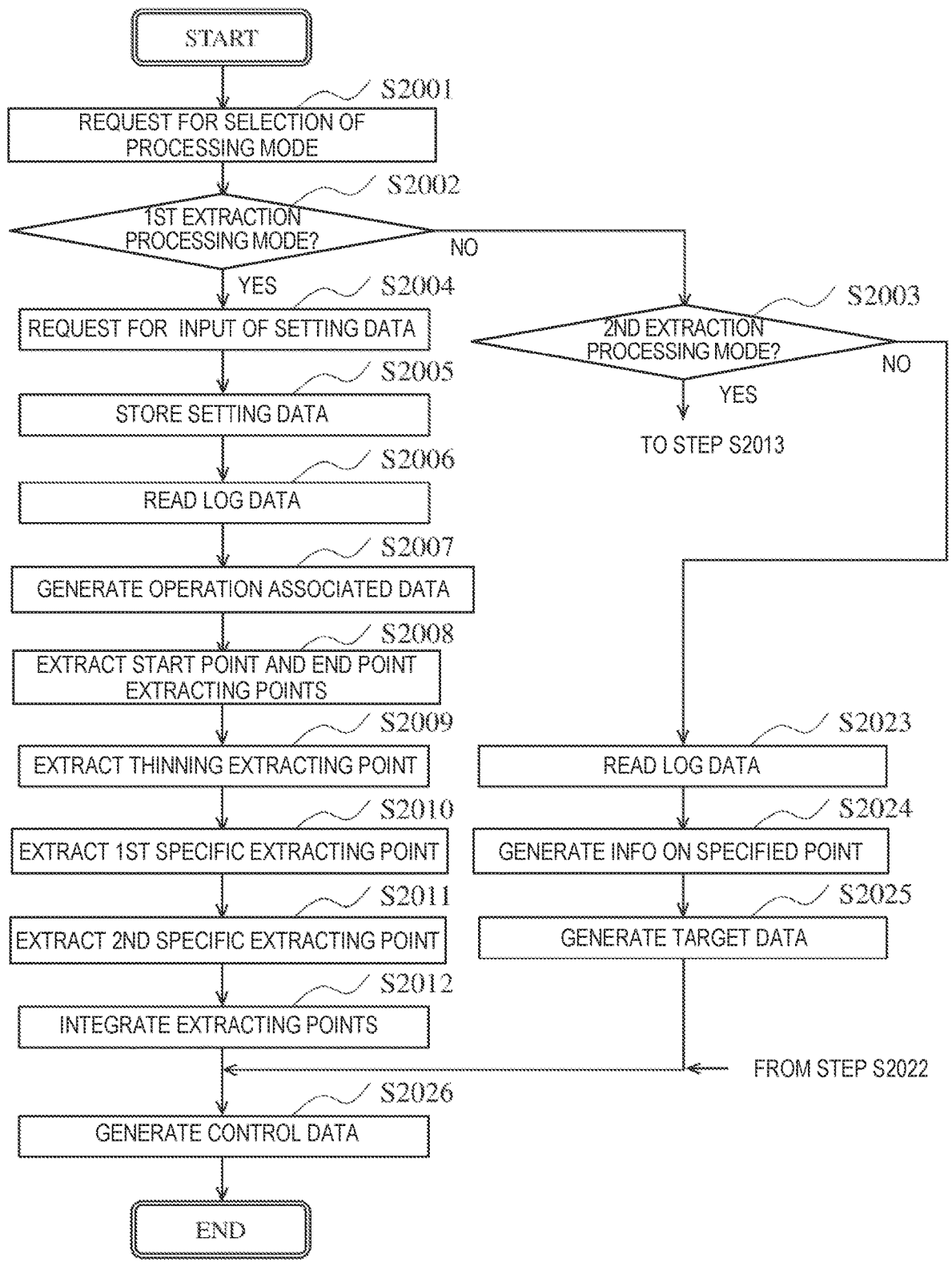
FIG. 18 is a flowchart illustrating one example of operation of an information processor according to Modification 2 of the exemplary embodiment.
Figure 19:
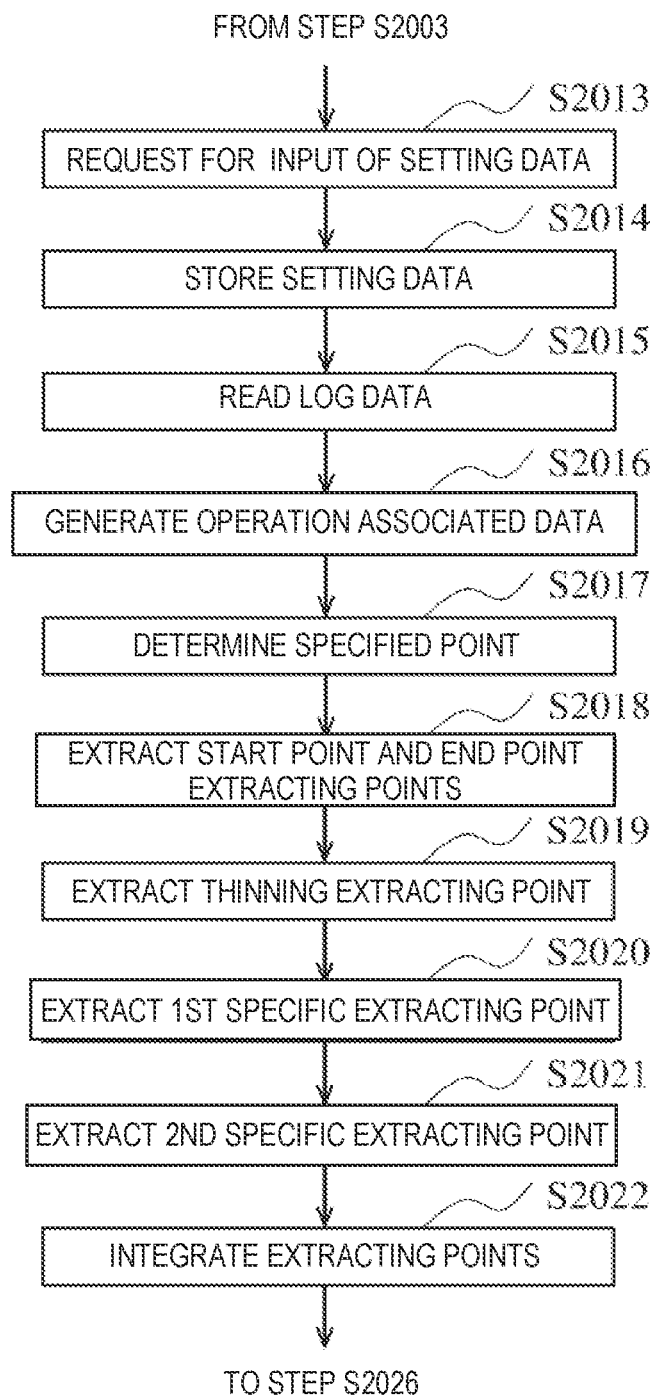
FIG. 19 is a flowchart illustrating one example of the operation of the information processor according to Modification 2.

Operation of the information processor 500 according to this modification is described with reference to FIGS. 18 and 19. FIGS. 18 and 19 are flowcharts illustrating one example of the operation of the information processor 500 according to Modification 2 of the exemplary embodiment. When the information processor 500 starts the processing, it then requests the user U for a selection of the processing mode (Step S2001).

If the first extraction processing mode is selected (Yes at Step S2002), the information processor 500 performs processings of Steps S2004-S2012. The processings of Steps S2004-S2012 are similar to the processings of Steps S1003-S1011 of Modification 1, respectively.

If the second extraction processing mode is selected (No at Step S2002 and Yes at Step S2003), the information processor 500 performs processings of Steps S2013-S2022. The processings of Steps S2013-S2016 are similar to the processings of Steps S1003-S1006 of Modification 1, respectively. The processings of Steps S2018-S2021 are similar to the processings of Steps S1007-S1010 of Modification 1, respectively.

At Step S2017, the information processor 500 determines the specified point DP by using the operation associated data Dc, and stores the information on the specified point DP in the memory part 520. For example, the information processor 500 extracts a point P at the input timing into the trigger button of the operation terminal 310 from a large number of points P included in the operation associated data Dc, and determines the extracted point P as the specified point DP.

At Step S2022, the information processor 500 integrates the start point extracting point Ps, the end point extracting point Pe, the thinning extracting point PT, the first specific extracting point PMmax, the second specific extracting point PPmax, and the specified point DP to generate the target data De, and stores it in the memory part 520.

If the specified processing mode is selected (No at Step S2002 and No at Step S2003), the information processor 500 performs processings of Steps S2023-S2025. The processings of Steps S2023-S2025 are similar to the processings of Steps S1012-S1014 of Modification 1, respectively.

At Step S2026, the information processor 500 generates the control data Df using the target data De, and stores it in the memory part 520. In the first extraction processing mode, the information processor 500 uses for the generation processing the information on the target point TP which is the extracting point extracted from the large number of points P. In the second extraction processing mode, the information processor 500 uses for the generation processing the information on the target point TP which is the extracting point extracted from the large number of points P, and the specified point. In the specified processing mode, the information processor 500 uses for the generation processing the information on the target point TP which is the specified point DP.

The information processor 500 generates the control data Df in the processing mode specified from the first extraction processing mode, the second extraction processing mode, and the specified processing mode, by performing the processings of Steps S2001-S2026. Although in this modification the information processor 500 uses, in the second extraction processing mode, the information on the specified point DP for the processing for determining the target point TP, it is not limited to this configuration. For example, in the processing for extracting the first specific extracting point PMmax, the information processor 500 may be configured to use the specified point DP as the first extracting point, and extract the first specific extracting point PMmax from the points including the first extracting point PM and the specified point DP. In the processing for extracting the second specific extracting point PPmax, the information processor 500 may be configured to use the specified point DP as the second extracting point, and extract the second specific extracting point PPmax from the points including the second extracting point PP and the specified point DP.

In the specified processing mode, the information processor 500 may be configured to process the target data De which includes the information on the start point extracting point Ps and the end point extracting point Pe which are generated from the log data Da, and the information on the specified point DP, as the information on the target point TP, to generate the control data Df.

Although in this modification the information processor 500 is configured to perform one of the processing modes which is selected from the first extraction processing mode, the second extraction processing mode, and the specified processing mode, it is not limited to this configuration. For example, the information processor 500 may be configured to perform one of the processing modes which is selected from the first extraction processing mode and the second extraction processing mode, and the information processor 500 may be configured to perform one of the processing modes which is selected from the second extraction processing mode and the specified processing mode. The information processor 500 may be configured to perform two or more among the first extraction processing mode, the second extraction processing mode, and the specified processing mode.

Other Embodiments

Although the illustrative embodiment and modifications of the present disclosure are described above, the present disclosure is not limited to the above embodiment and modifications. That is, various modifications and improvements are possible within the scope of the present disclosure. For example, the resultant of applying various modifications to the embodiment and the modifications, and a mode established by combining the components in different embodiments and modifications are also encompassed in the scope of the present disclosure.

For example, although in the extraction processing mode of the embodiment and the modifications the information processor 500 is configured to generate the target data De by using both the first specific extracting point PMmax and the second specific extracting point PPmax, it is not limited to this configuration. For example, the information processor 500 may generate the target data De, without using one or both of the first specific extracting point PMmax and the second specific extracting point PPmax. In the case where both the first specific extracting point PMmax and the second specific extracting point PPmax are not used, the information processor 500 may use one or both of the first extracting point PM and the second extracting point PP, instead. In the case where the first specific extracting point PMmax is not used as one of the specific extracting points, the information processor 500 may use the first extracting point PM instead of the first specific extracting point PMmax, or may use neither the first specific extracting point PMmax nor the first extracting point PM. In the case where the second specific extracting point PPmax is not used as one of the specific extracting points, the information processor 500 may use the second extracting point PP instead of the second specific extracting point PPmax, or may use neither the second specific extracting point PPmax nor the second extracting point PP. Separately from or together with the above case, the information processor 500 may generate the target data De without using the thinning extracting point PT.

Although in the embodiment and the modifications the information processor 500 is configured to be incorporated into the specific robot system 1 as a part thereof, it is not limited to this configuration. The information processor 500 may be disposed separately from the robot system 1, and, for example, it may be disposed solely. The information processor 500 may be configured to accept an input of log data Da of a robot in an arbitrary robot system, and generate control data Df using the log data Da.

Each example of the aspects of the technique of the present disclosure is listed as follows. The processing method according to one aspect of the present disclosure is a method of processing teaching data, the teaching data including the position/posture information on the end effector attached to the robot, and including the teaching points that form the moving route of the end effector in a time-series manner. The method includes one or both of the first processing and the second processing. In the first processing, the reference teaching point is extracted from the teaching points, and the extracted reference teaching point has the difference between the direction vector from the position of the teaching point preceding the reference teaching point by the given interval to the position of the reference teaching point, and the direction vector from the position of the reference teaching point to the position of the teaching point succeeding the reference teaching point by the given interval, being equal to or more than the threshold. In the second processing, the reference teaching point is extracted from the teaching points, and the extracted reference teaching point has one of the difference between the posture at the teaching point preceding the reference teaching point by the given interval and the posture at the reference teaching point, and the difference between the posture at the reference teaching point and the posture of the teaching point succeeding the reference teaching point by the given interval, being equal to or more than the threshold.

According to this aspect, one or both of the reference teaching point having the feature in the change in the moving direction of the end effector and the reference teaching point having the feature in the change in the posture of the end effector is extracted. These reference teaching points are those which constitute features on the moving route. The moving route of the end effector indicated by such reference teaching points can reflect the features of the moving route of the end effector. Further, the moving route indicated by the reference teaching points is comprised of a smaller quantity of reference teaching points than the quantity of teaching points of the teaching data, and thus has a simple configuration. For example, the teaching data in which the teaching points other than the reference teaching points are excluded can reflect the operation of the robot which moves the end effector with sufficient accuracy, and can have the simple configuration.

In the processing method according to one aspect of the present disclosure, the difference in the direction vector may be the angle formed by the direction vectors, and the given interval may include one or more intervals between the adjacent teaching points.

According to this aspect, the reference teaching point is determined based on the amount of change in the angle between the two direction vectors which are formed together with the teaching points preceding and succeeding it. For example, by setting the size of the given interval according to the moving route of the end effector, the reference teaching point can reflect the feature of the moving route of the end effector more accurately. The given intervals may be the same or different.

In the processing method according to one aspect of the present disclosure, the first processing may further include setting the first extracting area having the given distance range as the reference teaching point, and extracting, from the reference teaching points located within the first extracting area, the reference teaching point having the maximum difference in the direction vector.

According to this aspect, among the reference teaching points included in the first extracting area, the reference teaching point which reflects the feature of the moving route of the end effector more accurately is extracted. Since the quantity of extracted reference teaching points is reduced, the configuration of the moving route indicated by the reference teaching points becomes simple, while reflecting the feature of the moving route of the end effector.

In the processing method according to one aspect of the present disclosure, the extracting the reference teaching point having the maximum difference in the direction vector may include extracting the reference teaching point having the maximum difference in the direction vector from the reference teaching points located at or succeeding the reference point of the first extracting area along the moving route within the first extracting area.

According to this aspect, even in a case where one reference teaching point is included overlapping in two or more first extracting areas, processing the reference teaching point in each of the two or more first extracting areas is reduced. Thus, the quantity of reference teaching points which are not extracted is reduced. Therefore, it can be suppressed that the features of the moving route indicated by the reference teaching points are extremely reduced by the quantity of reference teaching points being extremely reduced.

In the processing method according to one aspect of the present disclosure, for the first extracting areas that are adjacent to each other along the moving route, the position of the reference point of the succeeding first extracting area may be set as the position of the reference teaching point immediately succeeding the preceding first extracting area along the moving route.

According to this aspect, the presence of reference teaching point which is included in neither of adjacent first extracting areas can be eliminated. Therefore, all of the reference teaching points can be processed as extraction target.

In the processing method according to one aspect of the present disclosure, the difference in the posture may be the angle formed by the vectors indicative of the orientation of the posture. The given interval may include one or more intervals between the adjacent teaching points.

According to this aspect, the reference teaching point is determined based on the amount of change in the angle of the direction vector of the posture with respect to at least one of the teaching points preceding and succeeding it. For example, by setting the size of the given interval according to the moving route of the end effector, the reference teaching point can reflect the feature of the change in the posture of the end effector in the moving route more accurately. The given intervals may be the same or different. The given interval in the second processing may be the same as or different from the given interval in the first processing.

In the processing method according to one aspect of the present disclosure, the second processing may further include setting the second extracting area having the given distance range as the reference teaching point, and extracting, from the reference teaching points located within the second extracting area, the reference teaching point having the maximum difference in the posture.

According to this aspect, among the reference teaching points included in the second extracting area, the reference teaching point which reflects the feature of the change in the posture of the end effector more accurately is extracted. Since the quantity of extracted reference teaching points is reduced, the configuration of the moving route indicated by the reference teaching points becomes simple, while reflecting the feature of the change in the posture of the end effector.

In the processing method according to one aspect of the present disclosure, the extracting the reference teaching point having the maximum difference in the posture may include extracting the reference teaching point having the maximum difference in the posture from the reference teaching points located at or succeeding the reference point of the second extracting area along the moving route within the second extracting area.

According to this aspect, even in a case where one reference teaching point is included overlapping in two or more second extracting areas, processing the reference teaching point in each of the two or more second extracting areas is reduced. Thus, the quantity of reference teaching points which are not extracted is reduced. Therefore, it can be suppressed that the features of the posture of the end effector on the moving route indicated by the reference teaching points are extremely reduced by the quantity of reference teaching points being extremely reduced.

In the processing method according to one aspect of the present disclosure, for the second extracting areas that are adjacent to each other along the moving route, the position of the reference point of the succeeding second extracting area may be set as the position of the reference teaching point immediately succeeding the preceding second extracting area along the moving route.

According to this aspect, the presence of reference teaching point which is included in neither of the adjacent second extracting areas can be eliminated. Therefore, all of the reference teaching points can be processed as extraction target.

The processing method according to one aspect of the present disclosure may further include the third processing in which the teaching points located at every given interval are extracted from the teaching points, and the fourth processing in which the teaching points extracted in the third processing are determined as the reference teaching points, in addition to the reference teaching points extracted in the first processing and the second processing. The given interval in the third processing may include two or more intervals between adjacent teaching points.

According to this aspect, the reference teaching points extracted in the third processing can indicate the process of change in the position of the end effector between the reference teaching points extracted in the first processing, and can indicate the process of the change in the posture of the end effector between the reference teaching points extracted in the second processing. Therefore, the moving route indicated by the reference teaching points determined by the fourth processing can achieve one or both of reflection of the feature of the change in the moving direction of the end effector and the process of the change in the moving direction, and reflection of the feature of the change in the posture of the end effector and the process of the change in the posture.

The processing method according to one aspect of the present disclosure may further include the processing in which the start point teaching point located at the start point of the moving route, and the end point teaching point located at the end point of the moving route, are extracted from the teaching points. In the fourth processing, the start point teaching point and the end point teaching point may be determined as the reference teaching points, in addition to the reference teaching points extracted in the first processing, the second processing, and the third processing. According to this aspect, it is possible to extract reference teaching points which correspond to the start point and the end point of the moving route, respectively.

In the processing method according to one aspect of the present disclosure, the information on the teaching points may correspond to information on the position and the posture of the end effector continuously acquired at a given sampling interval, in the process of the end effector being moved by the robot.

According to this aspect, the teaching data may be data acquired by actually making the robot operate, and it may be data using the log data of the robot, for example. The information on the teaching points included in such teaching data include information on the time-series order until arriving at the teaching points. The quantity of teaching points included in the teaching data is much larger than the quantity of teaching points included in common teaching data. The processing method can process such teaching data to determine reference teaching points which are smaller in the quantity and which may include time-series order information. Further, for example, the processing method can generate data such as new teaching data, by using the information on the reference teaching points. Therefore, it is possible to generate data of simple configuration, while using data of actual operation result of the robot. The sampling interval may be a time interval, or may be a distance interval.

In the processing method according to one aspect of the present disclosure, the processing in one of at least two processing modes may be selectively performed, the at least two processing modes being selected from a first processing mode, a second processing mode, and a third processing mode. In the first processing mode, data including at least either one of information on the reference teaching point extracted in the first processing, or information on the reference teaching point extracted in the second processing, may be generated. In the second processing mode, data including information on the teaching point determined beforehand among the teaching points, may be generated. In the third processing mode, data including one or more of information on the reference teaching point extracted in the first processing, and information on the reference teaching point extracted in the second processing, and information on the teaching point determined beforehand among the teaching points, may be generated.

According to this aspect, the data can be generated by using not only the reference teaching points but also the teaching points which are determined beforehand among the teaching points. The data reflects the information on the teaching points which are determined beforehand. The second processing mode can reduce the quantity of teaching points and simplify the moving route indicated by the teaching points, as compared to the first processing mode. The third processing mode can generate the moving route which reflects the feature of the moving route of the end effector more than the first processing mode.

A control device according to one aspect of the present disclosure is the control device for implementing the processing method according to one aspect of the present disclosure. According to this aspect, the similar effect to the processing method according to one aspect of the present disclosure can be acquired.

A program according to one aspect of the present disclosure is the program for implementing the processing method according to one aspect of the present disclosure. According to this aspect, the similar effect to the processing method according to one aspect of the present disclosure can be acquired. The above-described program is a computer-implementable program. The technology of the present disclosure may be a non-transitory computer-readable storage medium storing the above-described program. Further, needless to say, the above-described program can be distributed via a transmission medium, such as the Internet.

A robot system according to one aspect of the present disclosure includes the control device for implementing the processing method of one aspect of the present disclosure, the robot including the end effector, the operation terminal for the robot and the end effector, and the robot controller that controls operation of the robot and the end effector. The control device creates the teaching data based on the command of manual operation inputted into the operation terminal. The teaching data is processed to extract the reference teaching point, and the control data used for the control of the robot and the end effector is created by the robot controller, using information on the reference teaching point. According to this aspect, the similar effect to the processing method according to one aspect of the present disclosure can be acquired. Further, the robot system can process the teaching data which is acquired as a result of making the robot operate by the user using the operation terminal to generate the control data of the robot controller.

The functions of the elements disclosed herein can be performed using circuitry or processing circuitry including a general-purpose processor, a dedicated processor, an integrated circuit, an ASIC (Application-Specific Integrated Circuit), conventional circuitry, and/or a combination thereof, which are configured or programmed to execute the disclosed functions. Since the processor includes transistors or other circuitry, it is considered to be the processing circuitry or the circuitry. In this disclosure, the circuitry, the unit, or the means is hardware which performs the listed functions, or is hardware programmed to perform the listed functions. The hardware may be hardware disclosed herein, or may be other known hardware which are programmed or configured to perform the listed functions. When the hardware is the processor considered to be a kind of circuitry, the circuitry, the means, or the unit is a combination of hardware and software, and the software is used for a configuration of the hardware and/or the processor.

All the numbers used above, such as the order and the quantity, are illustrated in order to concretely explain the technique of the present disclosure, and the present disclosure is not limited to the illustrated numbers. The connection relationships between the components are illustrated in order to concretely explain the technique of the present disclosure, and the connection relationship which realizes the functions of the present disclosure is not limited to those relationships.

The division of blocks in the functional block diagram is one example. Blocks may be realized as one block, one block may be divided into blocks, and a part of a function may be moved to other blocks, and the blocks may be combined. Functions of blocks which have similar functions may be processed in parallel or in a time-divided manner by sole hardware or software.

Since the scope of the present disclosure is defined by the appended claims rather than the description of this specification so that the present disclosure may be implemented in various ways without departing from the spirit of the essential features, the illustrative embodiment and the modifications are illustrative but not restrictive. All the modifications of the claims and all the modifications within the scope of the claims, or the equivalents of the claims and the equivalents within the scope of the claims are intended to be encompassed in the appended claims.

The invention claimed is:

1. A method of processing teaching data, the teaching data including position information on an end effector attached to a robot, and including teaching points that form a moving route of the end effector in a time-series manner, the method comprising:
   a first processing including:
      extracting a reference teaching point from the teaching points, the extracted reference teaching point having a first difference between (i) a direction vector from a position of a teaching point preceding the reference teaching point by a given interval to a position of the reference teaching point, and (ii) a direction vector from the position of the reference teaching point to a position of a teaching point succeeding the reference teaching point by a given interval, the first difference being equal to or more than a threshold;
      setting a first extracting area having a given distance range around the reference teaching point; and
      extracting, from the reference teaching points located within the first extracting area, the reference teaching point having the maximum difference in the direction vector.

2. The method of claim 1, wherein the first difference in the direction vector is an angle formed by the direction vectors, and
   wherein the given interval includes one or more intervals between adjacent teaching points.

3. The method of claim 1, wherein the extracting the reference teaching point having the maximum difference in the direction vector includes extracting the reference teaching point having the maximum difference in the direction vector from the reference teaching points located at or succeeding the reference point of the first extracting area along the moving route within the first extracting area.

4. The method of claim 1, wherein, for the first extracting areas that are adjacent to each other along the moving route, the position of the reference point of the succeeding first extracting area is set as the position of the reference teaching point immediately succeeding the preceding first extracting area along the moving route.

5. The method of claim 1, wherein information on the teaching points correspond to information on the position of the end effector continuously acquired at a given sampling interval, in the process of the end effector being moved by the robot.

6. The method of claim 1, further comprising:
a second processing in which the reference teaching point is extracted from the teaching points, the extracted reference teaching point having one of a second difference between (i) a posture at a teaching point preceding the reference teaching point by a given interval and (ii) a posture at the reference teaching point, and a third difference between (i) the posture at the reference teaching point and (ii) a posture of a teaching point succeeding the reference teaching point by a given interval, the second or third difference being equal to or more than a threshold, wherein
processing in one of at least two processing modes is selectively performed, the at least two processing modes being selected from a first processing mode, a second processing mode, and a third processing mode,
in the first processing mode, data including at least either one of information on the reference teaching point extracted in the first processing, or information on the reference teaching point extracted in the second processing, are generated,
in the second processing mode, data including information on the teaching point determined beforehand among the teaching points, is generated, and
in the third processing mode, data including one or more among information on the reference teaching point extracted in the first processing, and information on the reference teaching point extracted in the second processing, and information on the teaching point determined beforehand among the teaching points, are generated.

7. A non-transitory computer readable medium for recording a program for causing a computer to implement the method of claim 1.

8. A method of processing teaching data, the teaching data including posture information on an end effector attached to a robot, and including teaching points that form a moving route of the end effector in a time-series manner, the method comprising:
extracting a reference teaching point from the teaching points, the extracted reference teaching point having one of a first difference between (i) a posture at a teaching point preceding the reference teaching point by a given interval and (ii) a posture at the reference teaching point, and a second difference between (i) the posture at the reference teaching point and (ii) a posture of a teaching point succeeding the reference teaching point by a given interval, the first or second difference being equal to or more than a threshold;
setting an extracting area having a given distance range around the reference teaching point; and
extracting, from the reference teaching points located within the extracting area, the reference teaching point having the maximum difference in the posture.

9. The method of claim 8, wherein the difference in the posture is an angle formed by the vectors indicative of the orientation of the posture, and
wherein the given interval includes one or more intervals between the adjacent teaching points.

10. The method of claim 8, wherein the extracting the reference teaching point having the maximum difference in the posture includes extracting the reference teaching point having the maximum difference in the posture from the reference teaching points located at or succeeding the reference point of the extracting area along the moving route within the extracting area.

11. The method of claim 8, wherein, for the extracting areas that are adjacent to each other along the moving route, the position of the reference point of the succeeding extracting area is set as the position of the reference teaching point immediately succeeding the preceding extracting area along the moving route.

12. A method of processing teaching data, the teaching data including position/posture information on an end effector attached to a robot, and including teaching points that form a moving route of the end effector in a time-series manner, the method comprising:
a first processing in which a reference teaching point is extracted from the teaching points, the extracted reference teaching point having a first difference between (i) a direction vector from a position of a teaching point preceding the reference teaching point by a given interval to a position of the reference teaching point, and (ii) a direction vector from the position of the reference teaching point to a position of a teaching point succeeding the reference teaching point by a given interval, the first difference being equal to or more than a threshold;
a second processing in which the reference teaching point is extracted from the teaching points, the extracted reference teaching point having one of a second difference between (i) a posture at a teaching point preceding the reference teaching point by a given interval and (ii) a posture at the reference teaching point, and a third difference between (i) the posture at the reference teaching point and (ii) a posture of a teaching point succeeding the reference teaching point by a given interval, the second or third difference being equal to or more than a threshold;
a third processing in which the teaching points located at every given interval are extracted from the teaching points; and
a fourth processing in which the teaching points extracted in the third processing are determined as the reference teaching points, in addition to the reference teaching points extracted in the first processing and the second processing,
wherein the given interval in the third processing includes two or more intervals between adjacent teaching points.

13. The method of claim 12, further comprising a processing in which a start point teaching point located at a start point of the moving route, and an end point teaching point located at an end point of the moving route, are extracted from the teaching points,
wherein, in the fourth processing, the start point teaching point and the end point teaching point are determined as the reference teaching points, in addition to the reference teaching points extracted in the first processing, the second processing, and the third processing.

14. A robot system, comprising:
a control device for implementing a method of processing teaching data, the teaching data including position/posture information on an end effector attached to a robot, and including teaching points that form a moving route of the end effector in a time-series manner, the method comprising:

a first processing in which a reference teaching point is extracted from the teaching points, the extracted reference teaching point having a first difference between (i) a direction vector from a position of a teaching point preceding the reference teaching point by a given interval to a position of the reference teaching point, and (ii) a direction vector from the position of the reference teaching point to a position of a teaching point succeeding the reference teaching point by a given interval, the first difference being equal to or more than a threshold, and a second processing in which the reference teaching point is extracted from the teaching points, the extracted reference teaching point having one of a second difference between (i) a posture at a teaching point preceding the reference teaching point by a given interval and (ii) a posture at the reference teaching point, and a third difference between (i) the posture at the reference teaching point and (ii) a posture of a teaching point succeeding the reference teaching point by a given interval, the second or third difference being equal to or more than a threshold;

the robot including the end effector;

an operation terminal for the robot and the end effector; and a robot controller that controls operation of the robot and the end effector, wherein the control device creates the teaching data based on a command of manual operation inputted into the operation terminal, and wherein the teaching data is processed to extract the reference teaching point, and the control data used for the control of the robot and the end effector is created by the robot controller, using information on the reference teaching point.

* * * * *